United States Patent [19]

Jin et al.

[11] Patent Number: 5,430,665
[45] Date of Patent: Jul. 4, 1995

[54] APPARATUS AND METHOD FOR MEASURING LENGTH OF MOVING ELONGATED OBJECT

[75] Inventors: Dong Zhi Jin; Kazuro Kurihara; Fumihiko Abe, all of Chiba, Japan

[73] Assignee: The Furukawa Electric Co., Ltd., Tokyo, Japan

[21] Appl. No.: 768,945
[22] PCT Filed: Feb. 28, 1991
[86] PCT No.: PCT/JP91/00269
 § 371 Date: Oct. 22, 1991
 § 102(e) Date: Oct. 22, 1991
[87] PCT Pub. No.: WO91/18261
 PCT Pub. Date: Nov. 28, 1991

[30] Foreign Application Priority Data

| May 22, 1990 | [JP] | Japan | 2-130234 |
| May 22, 1990 | [JP] | Japan | 2-130235 |
| May 22, 1990 | [JP] | Japan | 2-130236 |
| Aug. 7, 1990 | [JP] | Japan | 2-208822 |
| Sep. 18, 1990 | [JP] | Japan | 2-247697 |
| Oct. 18, 1990 | [JP] | Japan | 2-279775 |
| Nov. 22, 1990 | [JP] | Japan | 2-315742 |

[51] Int. Cl.⁶ .................. G01B 5/04; G06F 15/20
[52] U.S. Cl. .................... 364/562; 364/469; 33/735
[58] Field of Search ........... 364/468, 469, 470, 561, 364/562; 33/735, 736, 738, 745, 501.02, 501.03

[56] References Cited

U.S. PATENT DOCUMENTS

| 3,406,601 | 10/1968 | Clifford | 364/562 X |
| 4,052,599 | 10/1977 | Whiteley et al. | 364/469 |
| 4,718,168 | 1/1988 | Kerr | 364/562 X |
| 4,984,458 | 1/1991 | Montgomery et al. | 364/562 X |
| 5,235,515 | 8/1993 | Ungpiyakul et al. | 364/469 |

FOREIGN PATENT DOCUMENTS

| 56-1301 | 1/1981 | Japan. |
| 56-117101 | 9/1981 | Japan. |

Primary Examiner—Ellis B. Ramirez
Assistant Examiner—Eric W. Stamber
Attorney, Agent, or Firm—Nikaido Marmelstein Murray & Oram

[57] ABSTRACT

A length measuring apparatus for accurately measuring the length of a communication cable or other elongated object in the moving state and a method for the same. The preferable length measuring apparatus is a combination of a marking system and encoder system. The marking system counts the number of times a cable (1) moves by a standard length measurement distance (S) using that standard length measurement distance as one unit. To detect the conveyance of the cable by standard length measurement distances, a marker (43) makes marks (44) on the cable surface and the marks are detected by a laser switch or other sensor (46). The fine differences in distance between the standard length measurement distance and the mark interval (MS), that is, the surplus lengths ($C_1$), are detected from the value of an encoder at the timing of detection of the marks. The length measuring apparatus body (51) controls the marker and sensor and calculates the final distance of movement of the cable, that is, the measured distance of the cable, by adding the product of the standard length measurement distance and the count to the sum of the above-mentioned surplus lengths.

30 Claims, 29 Drawing Sheets

F I G. 26
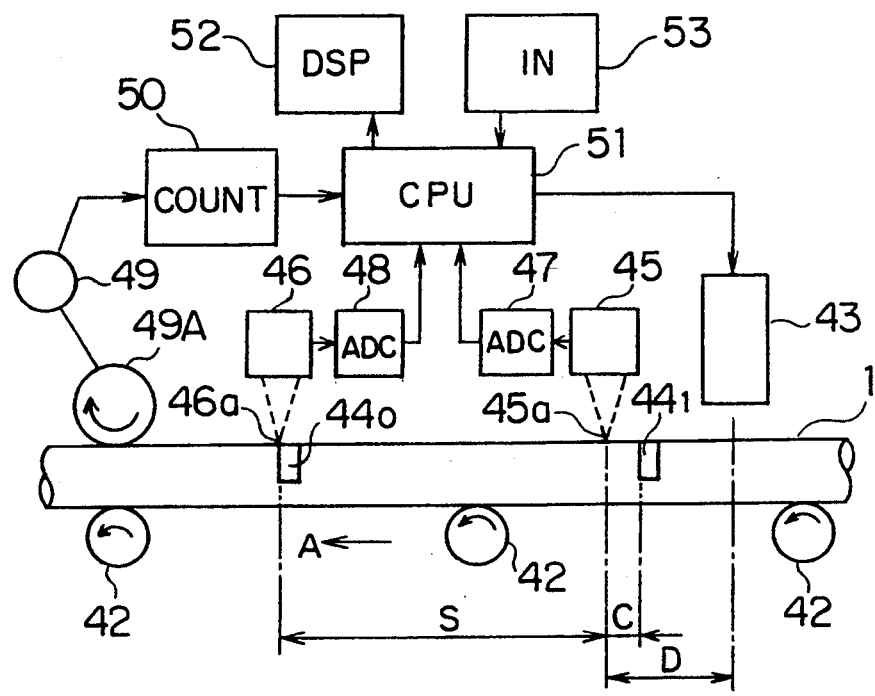

FIG. 28
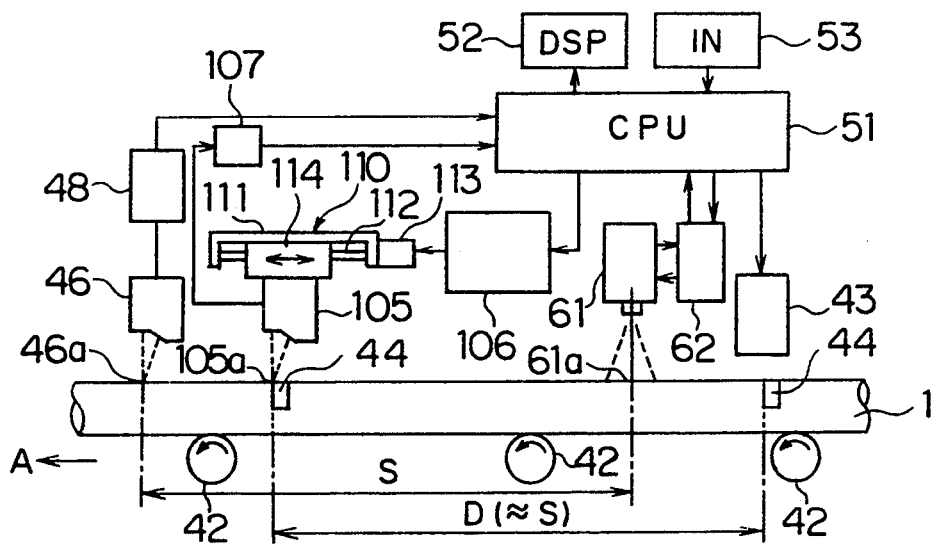
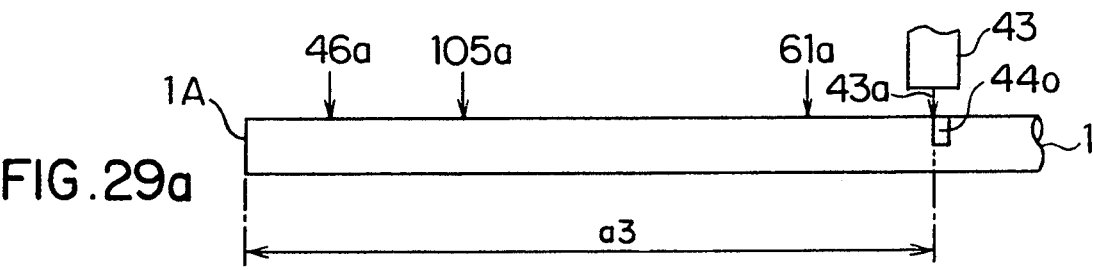
FIG. 29a
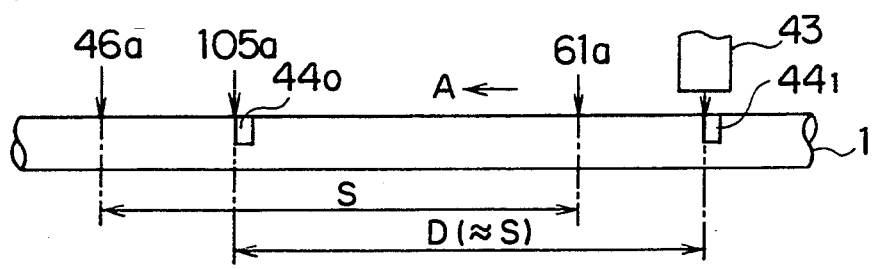
FIG. 29b
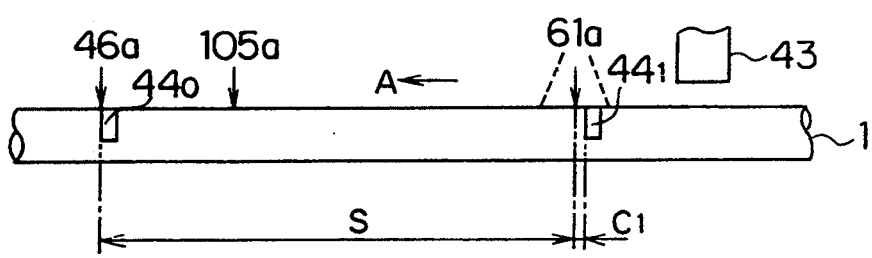
FIG. 29c

APPARATUS AND METHOD FOR MEASURING LENGTH OF MOVING ELONGATED OBJECT

TECHNICAL FIELD

The present invention relates to a length measuring apparatus and length measuring method for accurately measuring the length of a moving elongated object, for example, a communication cable.

BACKGROUND ART

When measuring the length of an elongated object such as a communication cable or power cable, usually the length is measured while the elongated object is in a moving state. The method of measurement is to measure the lengths of cable for standard length measurement distances and to add up the lengths measured for these standard length measurement distances. Cables are extremely long in length, so if the measurement errors for each standard length measurement distance are accumulated, they become a massive error in terms of the length of the overall cable. Therefore, the precision of measurement of the length of the cable in each standard length measurement distance must be made with extremely high precision.

Recently, attempts have been made to commercialize a prefabrication work process using cables measured with a high precision. In such a prefabrication work process, it is necessary to measure the cable length with an extremely high precision of, for example, 0.02 percent.

In the past, as a method for measuring cable length, there has been known the encoder system and the marking system.

The encoder system measures the length of a cable by bringing a single encoder wheel (rotational member) into contact with a moving cable, turning the encoder wheel by the movement of the cable, outputting pulses corresponding to the amount of movement of the cable from the encoder, and counting the pulses.

The encoder system has the advantages that it enables measurement of length with a simple construction and enables measurement of length even with short unmeasurable lengths. In the encoder system, however, the error is considerably large due to the slipping of the encoder wheel, the fluctuations in the outer diameter of the encoder wheel due to temperature changes, wear, etc., and the deformation of the surface of the cable. Thus, the precision of detection is at best 0.2 percent or so, and there is the problem that the high precision of 0.02 percent or so required for the prefabrication work process etc. cannot be obtained.

On the other hand, the marking system, for example, is disclosed in Japanese Unexamined Published Patent Application (Kokai) No. 57-28204. In this marking system, a marker and a sensor for detecting marks provided by the marker are provided and are separated by a standard length measurement distance in the direction of movement of the cable. When the sensor detects a mark, it outputs a detection signal to the length measurement apparatus body, which drives the marker to make a mark on the surface of the cable, to indicate the cable as having moved by exactly by the standard length measurement distance, and advances the counter by 1. The marks made by the marker are detected by the sensor. The operation of measuring the length of the cable for each standard length measurement distance is repeated and the standard length measurement distance S is multiplied with the final count N to calculate the overall length of the cable.

The marking system measures the length of a cable as a whole multiple of a predetermined standard length measurement distance, thus has the advantage of a higher precision of measurement than the encoder system. However, the marking system has the problems that it is impossible to measure lengths shorter than a standard length measurement distance, measurement error occurs when the distance between marks around when the positional marking precision of the marker on the moving cable is low, measurement error occurs when the speed of movement of the cable fluctuates, and measurement error occurs when the operational timing of the marker deviates due to the unevenness of the surface of the cable and the distance between marks fluctuates.

Further, whether by the encoder system or the marking system, the problem is encountered that it is impossible to check the factors behind the occurrence of such errors.

DISCLOSURE OF THE INVENTION

The object of the present invention is to provide a length measuring apparatus and a length measuring method which measure the length of an elongated object, such as a cable, with a high precision when the object is in a moving state.

The present invention further provides a length measuring apparatus and length measuring method which can accurately measure the length even if the speed of movement of the moving elongated object fluctuates.

Also, the present invention provides a length measuring apparatus having a high degree of reliability.

Further, the present invention provides a length measuring apparatus and length measuring method using the marking system which measure the standard length measurement distance, for which accuracy is essential in such an apparatus and method.

Based on the present invention, there is provided a length measuring apparatus including first and second mark detecting means which are arranged along a direction of movement of an elongated object at exactly a standard length measurement distance and detect marks provided on the moving elongated object or marks provided on a tape moving along with the elongated object, a surplus length measuring means which measures the surplus length comprised of the difference between the distance between one mark and another mark provided on the moving elongated object or the distance between one mark and another mark provided on a tape and the standard length measurement distance, and a computation and control means which is connected to the first and second mark detecting means and surplus length measuring means. The computation and control means counts the movements of the elongated object by the standard length measurement distance in response to a mark detection signal from the second mark detecting means corresponding to the movement of the elongated object every standard length measurement distance, and calculates the surplus length based on the input from the surplus length measuring means in response to detection of a mark from the first mark detection means.

Further, the above-mentioned computation and control means performs the following functions: calculates the product of the count showing the movements of the elongated object by the standard length measurement distance and of the standard length measurement distance when the elongated object has moved by the standard length measurement distance a plurality of times; calculates the sum of the surplus lengths of the plurality of times; adds the product of the count and the standard length measurement distance and the sum of the surplus lengths; and calculates the distance of movement of the elongated object.

Preferably, the surplus length measuring means measures the continuous distance of movement of the elongated object.

More specifically, the surplus length measuring means has an encoder means which has a rotating body which rotates in contact with the surface of the elongated object and outputs a position detection pulse in accordance with that rotation and a counting means which counts the output pulses from the encoder means. The computation and control means calculates the surplus length by referring to the count of the counting means in response to the detection of a mark by the first mark detecting means and updates the count showing the movements of the elongated object by the standard length measurement distance in response to the detection of a mark by the second mark detecting means.

More specifically, the surplus length measuring means is a laser type movement distance measurement apparatus which uses the Doppler effect.

Alternatively, the surplus length measuring means is a laser type movement distance measurement apparatus which utilizes a spectral pattern.

More preferably, the surplus length measuring means has an optical detecting means which has a centerline of detection oriented toward the end of the rear of the direction of movement of the standard length measurement distance. The surplus length measuring means detects the range of spread about the centerline during detection, and outputs the result as the image data. The computation and control means calculates the surplus length based on the image data from the optical detecting means in response to the detection of a mark by the first mark detecting means and updates the count showing the movements of the elongated object by the standard length measurement distance in response to the detection of a mark by the second mark detecting means.

Preferably the moving tape has marks provided in advance at substantially constant intervals.

More preferably, the tape is provided with optically detectable marks in advance at substantially constant intervals on the surface thereof and the first and second mark detecting means have optical mark detecting means.

More preferably, the tape is coated with a magnetic material, magnetic marks are provided in advance on the magnetic coating at substantially constant intervals, and the first and second mark detecting means have magnetic mark detecting means.

Further, the length measuring apparatus of the present invention has arranged at the rear of the direction of movement of the first mark detecting means a marking means which provides optically detectable marks on the elongated object, the first and second mark detecting means have first and second optical sensors which optically detect the marks provided by the marking means, the surplus length measuring means has an encoder means which has a rotating body which rotates in contact with the surface of the elongated object and outputs a position detection pulse signal in accordance with that rotation and a counting means which counts the pulse signals from the encoder means, and the computation and control means calculates the surplus length based on the count of the counting means in response to the detection of a mark by the first mark detecting means and updates the count showing the movement of the elongated object by said standard length measurement distance in response to the detection of a mark by the second mark detecting means.

Further, the marking means is arranged at a position at the rear of the direction of movement of the first mark detecting means substantially equal to the standard length measurement distance.

Preferably, the length measuring apparatus of the present invention is provided with a third optical mark detecting means arranged between the optical mark detecting means and the second optical mark detecting means and a movement means which moves the third optical mark detecting means between the first and second mark detecting means and the computation and control means drives the movement means so that the interval between the marking means and the third mark detecting means becomes equal to the standard length measurement distance.

Further, the length measuring apparatus of the present invention has, near the moving elongated object, which is the centerline of detection of the optical detecting means, a reference scale having graduations provided along the direction of movement of the moving elongated object, the optical detecting means outputs as image data the marks, which are at positions away from the centerline of detection, along with the graduations of the reference scale, and the computation processing means calculates the surplus length from the image data.

Preferably, the second optical mark detecting means has at least two adjoining optical mark detecting means whose centerlines of detection coincide at a position intersecting the direction of movement of the elongated object, the optically detectable marks provided on the elongated object or the tape moving along with the elongated object have edges inclined to the direction of movement of the elongated object, the two optical mark detecting means detect the inclined edges, and the computation and control means corrects the calculation of the distance based on the difference of the edge detection timings of the two optical mark detecting means.

Further, in the length measuring apparatus of the present invention, provision is made of a means for making a magnetic tape moving along with the elongated object adhere to the surface of the elongated object, a magnetic marking means is arranged which provides magnetic marks on the magnetic tape in the front of the direction of movement of the first mark detecting means, the first and second mark detecting means have first and second magnetic sensors which magnetically detect the magnetic marks provided by the magnetic marking means, the surplus length measuring means is provided with an encoder means which has a rotating body which rotates in contact with the surface of the elongated object and outputs position detection pulses in accordance with the rotation and a counting means which counts the pulse signals from the encoder means, and the computation and control means calculates the surplus length by referring to the count of the counting means in response to the detection of the magnetic mark by the first magnetic mark detecting means and updates the count showing the movements of the elongated object by the standard length measurement distance in response to the detection of the magnetic mark of said second magnetic mark detecting means.

According to the present invention, further, provision is made of a length measuring apparatus including an optical detecting means which detects optically detectable marks provided at substantially constant intervals on a moving elongated object or optically detectable marks provided at predetermined intervals on a tape moving along with the elongated object, with a certain spread centered about the same, and outputs the same as image data, mark detecting means which are arranged along the direction of movement of the elongated object separated by the standard length measurement distance and detects the edges of the marks provided on the moving elongated object or the marks provided on the tape moving along with the elongated object, and a computation and control means which is connected to the optical detecting means and mark detecting means, measures the surplus length comprised of the difference in distance between the distance between one the mark and another mark provided on the moving elongated object or the distance between one the mark and another mark provided on the tape and the standard length measurement distance through the optical detecting means in response to the detection of a mark from the mark detecting means, and counts the movements of the elongated object by the standard length measurement distance.

Preferably, the computation and control means calculates the product of the count showing the movements of the elongated object by the standard length measurement distance and the standard length measurement distance when the elongated object has moved the standard length measurement distance a plurality of times, calculates the sum of the surplus lengths of the plurality of times, and adds the product of the count and standard length measurement distance and the surplus length to calculate the distance of movement of the elongated object.

Further, according to the present invention, there is provided a length measuring apparatus including a means for bringing something into contact with the surface of the elongated object and moving it along with the movement of the elongated object, a marking means which provides a magnetic mark on the magnetic tape, a magnetic mark detecting means which is arranged along the direction of movement of the elongated object separated from the magnetic marking means by the standard length measurement distance, a member which fixes the marking means and the magnetic mark detecting means and automatically adjusts the change in length accompanying temperature changes of the elongated object, and a means which is connected to the marking means and the magnetic mark detecting means, provides a new magnetic mark on the magnetic tape through the marking means in response to a detection signal from the magnetic mark detecting means, counts the movements of the elongated object by the standard length measurement distance, and calculates the product of the count and the standard length measurement distance.

Preferably, the operational control means has a first memory means for storing detection signals from the first mark detecting means, a second memory means for storing detection signals from the second mark detecting means, a means for rewriting the stored information of the first and second memory means, an initial information command means for commanding a length measurement operation of the elongated object, a reference information selection and memory command means which selects the reference information from the memory information from the first memory means, a reference information memory means which stores the selected information from the reference information selection command means, an information output means which compares the information stored in the second memory means and the information stored in the reference memory means and outputs a signal when they match, a means which counts the number of lengths which counts the movements of the elongated object by the standard length measurement distance in response to the coincidence signal from the information output means, and a means which multiplies the count of the length counting means and the value of the standard length measurement distance to calculate the distance of movement of the elongated object.

Further, the operational control means is provided between the reference information selection and storage command means and the memory rewriting means with an operational time setting means which operates the memory rewriting means after the elapsing of a predetermined time and stores only the information effectively used among the information stored in the first and second memory means.

Preferably, the standard length measurement distance is comprised to be automatically adjustable in accordance with the temperature changes of the elongated object.

The means for automatically adjusting the standard length measurement distance in accordance with the temperature changes of the elongated object may be a rod of the same material as the elongated object which extends in the direction of movement of the elongated object.

Preferably, there is provided a means for inputting the distance from the front end of the elongated object to the measuring portion of the surplus length measuring means or the distance from the front end of the elongated object to the second mark detecting means and the distance from the first mark detecting means to the rear end of the elongated object or the distance from the optical marking means which provides the optical marks to the rear end of the elongated object, and the computation and control means adds the distances inputted to the calculation of the length of the elongated object.

The optical detecting means which detects with a certain spread from the centerline of detection and outputs the results as image data has an image camera and a signal processing circuit.

The optical mark detecting means bas a laser switch.

The optically detectable mark is made by an ink jet or stamp. Further, the magnetic mark may be a bar code.

Also, according to the length measuring apparatus of the present invention, there is provided a duplicated apparatus of the above length measuring apparatus, that is, a length measuring apparatus provided with second and third mark detecting means which are arranged along the direction of movement of the elongated object at the standard length measurement distance and detect marks provided on a moving elongated object or marks provided on a tape moving along with the elongated object, a first mark detecting means which is arranged at the rear of the direction of movement of the elongated object near the second market detecting means, a fourth mark detecting means which is arranged in the front of the direction of movement of the elongated object near the third mark detecting means, a first surplus length measuring means which measures the surplus length comprising the difference of distance between the distance between one mark and another mark provided on the moving elongated object or the distance between one mark and another mark provided on the tape and the standard length measurement distance, a second surplus length measuring means which has a measuring portion provided along the direction of movement of the elongated object at a predetermined distance away from the measuring portion of the first surplus length measuring means and measures the surplus length comprising the difference of distance between the distance between one mark and another mark provided on the moving elongated object or the distance between one mark and another mark provided on the tape and the standard length measurement distance, and a computation and control means which is connected to the first to fourth mark detecting means and first and second surplus length measuring means, judges trouble of the first to fourth mark detecting means and first and second surplus length measuring means, uses the normally operating mark means and surplus length measuring means, uses the normal said first or second mark detecting means as the decided on first mark detecting means, responds to the detection of a mark from the mark detecting means and calculates the surplus length based on the input from the normal surplus length measuring means, and uses the normal third or fourth mark means as the decided on second mark detecting means, responds to the mark detection signals from the second mark detecting means and counts the movements of the elongated object by the standard length measurement distance.

According to another aspect of the present invention, there is provided a method for working the above length measuring apparatus, i.e., a length measuring method of an elongated object having a step of providing a mark on the surface of a moving elongated object or a tape moving along with the elongated object, a first mark detecting stage of detecting said mark, a step of counting the movements of the elongated object by a predetermined standard length measurement distance in response to the first mark detection, a step of providing a new mark on the surface or the elongated object or the tape in response to the mark detection, and a step of calculating a surplus length comprising a difference between the standard length measurement distance and the distance between the adjoining one mark and another mark.

Preferably the above-mentioned method has a further step of calculating the distance of movement of the elongated object by adding the product of said counted value and the standard length measurement distance with the sum of the plurality of surplus lengths.

Further, according to another aspect of the present invention, there is provided a length measuring apparatus having a first encoder means which has a first rotating member contacting an elongated object and which outputs pulse signals corresponding to the movement of the elongated object, a first counting means which counts the pulse signals from the first encoder means, a second encoder means which has a second rotating member which contacts the elongated object at a position away from the first rotating member and which outputs a pulse count corresponding to the movement of the elongated object, a second counting means which counts the pulse signals from the second encoder means, and a control means which receives as input the counts of the first and second counting means at predetermined periods, compares the two counts, and sets the count of the counting means with the larger count in the counting means with the smaller count.

Further, according to the present invention, there is provided a standard length measurement distance measuring apparatus for accurately measuring the above-mentioned standard length measurement distance, which a standard length measurement distance measuring apparatus has two labels provided at the two ends of the standard length measurement distance, a linear scale means which can move along the direction of movement of the elongated object between two labels, has an absolute origin, and has graduations provided linearly along the direction of movement, a slide head means which detects the graduations of the linear scale, and a sensor which moves along with the linear scale means and detects the edges of the labels, the linear scale means being moved along the direction of movement of the elongated object and the standard length measurement distance being measured from the distance of the two ends where the sensor detected the edges of the labels.

BRIEF DESCRIPTION OF THE DRAWINGS

FIG. 26 is a view showing the construction of a length measuring apparatus of a 12th embodiment of the present invention;

FIG. 28 is a view showing the construction of a length measuring apparatus as a 13th embodiment of the present invention;

FIGS. 29a to 29g are views for explaining the operation of the length measuring apparatus shown in FIG. 28;

BEST MODE FOR CARRYING OUT THE INVENTION

Figure 1:
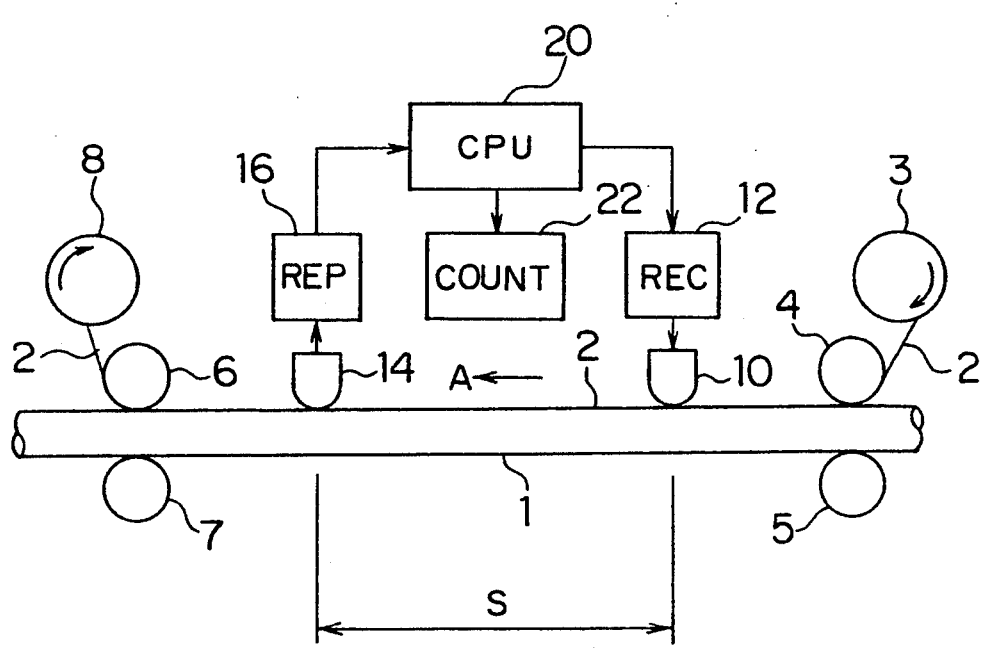
FIG. 1 is a view showing the construction of a length measuring apparatus of the magnetic marking system as a first embodiment of the present invention.

FIG. 1 shows the construction of a cable length measuring apparatus of the marking system as a first embodiment of the present invention.

In FIG. 1, a cable 1 to be measured in length is moved (is conveyed) by a conveyance mechanism (not illustrated) in the arrow direction A at a predetermined speed of movement v1, for example, 20 m/s.

The cable length measuring apparatus has a tape supply drum 3 for supplying magnetic tape 2 coated with an adhesive on the reverse for adhesion to the surface of a moving cable 1, a tape adhering roller 4, a backup roller 5 which cooperates with the tape adhering roller 4, a tape peeling roller 6 for peeling off the magnetic tape 2 adhered to the cable 1 by the adhesive, a backup roller 7 which cooperates with the tape peeling roller 6, and a tape takeup drum 8. The cable length measuring apparatus, further, has a magnetic recording head 10 and a magnetic reproduction head 14 arranged separated by a standard length measurement distance S, for example, 1 to 3 meters or so. Further, the length measuring apparatus has a magnetic recording circuit 12 and magnetic reproduction circuit 16 connected to the heads 10 and 14. The length measuring apparatus body 20 with the counter 22 apparatus body 20 incorporate, for example, a central processor unit (CPU) of a computer and a memory.

An explanation will now be made of the length measuring operation of a moving cable using the length measuring apparatus shown in FIG. 1.

The tape supply drum 3 has a magnetic tape 2 wound around it. A tape takeup drum 8 winds up the magnetic tape 2 conveyed along with the cable 1 through the path of the tape adhering roller 4, the magnetic recording head 10, the magnetic reproduction head 14, and the tape peeling roller 6. At this time, the magnetic tape 2 is rewound from the tape supply drum 3. The surface of the magnetic tape 2 which contacts the magnetic recording head 10 and the magnetic reproduction head 14 is coated with a magnetic material, while the reverse of the magnetic tape 2 which contacts the surface of the cable 1 is coated with a peelable adhesive. The magnetic tape 2, as illustrated, is threaded in advance through the path of the tape supply drum 3, the tape adhering roller 4, the magnetic recording head 10, the magnetic reproduction head 14, the tape peeling roller 6, and the tape takeup drum 8. The tape adhering roller 4 rotates in the illustrated direction, whereby magnetic tape 2 is rewound from the tape supply drum 3 and the reverse of the rewound magnetic tape 2 is pressed against the surface of the moving cable 1 so that the magnetic tape 2 is adhered to the surface of the cable 1. The backup roller 5 prevents the cable 1 from being pressed in by the pressure of the tape adhering roller 4. The magnetic tape 2 is affixed to the surface of the cable i by an adhesive, so the magnetic tape 2 moves along with the cable i in the arrow direction A without slipping. The tape takeup drum 8 rotates in the arrow direction, whereby the magnetic tape 2 adhered to the cable i is peeled from the surface of the cable 1 through the tape peeling roller 6. The backup roller 7 also cooperates with the tape peeling roller 6 and does not hinder the movement of the cable 1 in the peeling operation of the magnetic tape 2. The above fixing and peeling of the magnetic tape 2 to the surface of the cable i are performed together with the movement of the cable 1 and without impairing the smooth and continuous movement of the cable 1.

The surface of the magnetic tape 2 is coated with a magnetic material. In the process of conveyance of the above-mentioned magnetic tape 2 and the cable 1, the magnetic tape 2 contacts the magnetic recording head 10 and the magnetic reproduction head 14 and the length of the cable 1 is measured.

If workers give a command to the length measuring apparatus body 20 to start the length measurement, the length measuring apparatus body outputs a reset command to the counter 22 to clear the count of the counter 22. At the same time as this, the length measuring apparatus body 20 outputs a marking command to the magnetic recording circuit 12. Responding to the outputs, the magnetic recording circuit 12 records a magnetic mark on the moving magnetic tape 2 through the magnetic recording head 10.

When the magnetic tape 2 is moved and passes the magnetic reproduction head 14, the mark recorded at the magnetic recording head 10 is detected by the magnetic reproduction head 14. The detection signal of the magnetic reproduction head 14 is processed for signal reproduction at the magnetic reproduction circuit 16 and the reproduced signal is output to the length measuring apparatus body 20. The length measuring apparatus body 20 responds to the input of the reproduced signal and drives the magnetic recording circuit 12 to perform the next marking on the magnetic tape 2 through the magnetic recording head 10 and, at the same time, outputs a mark count signal to the counter 22 to advance the count of the counter 22 by exactly 1.

After this, in the same way, the magnetic marking by the magnetic recording head 10, the detection of the magnetic mark by the magnetic reproduction head 14, and the count updating operation of the counter 22 by the length measuring apparatus body 20 are repeated.

During the above operation, when the speed of movement v1 of the cable 1 is considered to be constant and the count of the counter 22 by the above-mentioned length measuring operation becomes N, the length L1 of the measured cable 1 is given by the following equation:

$$L1 = S \cdot N \quad (1)$$

According to the first embodiment of the present invention, the magnetic tape 2 is conveyed along with the cable 1 without slipping. Further, the marking system using the magnetic recording head 10 is performed magnetically, so the operating time is high in speed. The width of the magnetic mark is also an extremely narrow (several microns or so) so even when detecting the magnetic marks by the magnetic reproduction head 14, the error in detection in the longitudinal direction of the cable 1 is small. Further, the control operation from the detection of the mark by the magnetic reproduction head 14 to the recording of the next mark from the magnetic recording head 10 is performed electrically. Thus, the operation is short in time and the time delay with respect to the moving magnetic tape 2 is small.

As is clear from the above, according to this embodiment, it becomes possible to measure the length of the cable 1 with high precision. Further, the length of the cable 1 can be calculated just by multiplying the standard length measurement distance S with the count of the counter 22, so the length measuring signal processing is easy.

The adhesive on the reverse of the magnetic tape 2 peeled from the surface of the cable 1 by the tape peeling roller 6 and wound up by the tape takeup drum 8 is one which is superior in both adhesion to and peeling from the surface of the cable 1. Further, the adhesive can be stably adhered to the surface of the cable 1, can be easily peeled from the surface of the cable 1, and leaves little residual stickiness. Note that the adhesive of the magnetic tape 2 may not only be on the reverse as mentioned above, but may also be coated on both sides.

As a method for reducing the consumption of the magnetic tape 2, one may construct an endless magnetic tape circulating loop formed by the tape supply drum 3, the tape adhering roller 4, the magnetic recording head 10, the magnetic reproduction head 14, the tape peeling roller 6, and the tape takeup drum 8. The magnetic tape 2 would be operated to go around in the loop. In this case, a demagnetization member would be provided between the tape takeup drum 8 and the tape supply drum 3 so that the marks made by the magnetic recording head 10 would be erased before the next marking.

When not an obstruction to the cable 1, it is possible to have the magnetic tape 2 left adhered as is to the cable 1. In this case, the tape peeling roller 6, the backup roller 7, and the tape takeup drum 8 shown in FIG. 1 become unnecessary.

Further, instead of coating an adhesive, by making the reverse of the magnetic tape 2 sufficiently rough and increasing the coefficient of friction to prevent sliding against the surface of the cable 1, it is possible to press the magnetic tape 2 against the surface of the cable 1 and make it stick there without the use of the above-mentioned adhesive and to measure the length of the cable 1 in the same way as above.

Figure 2:
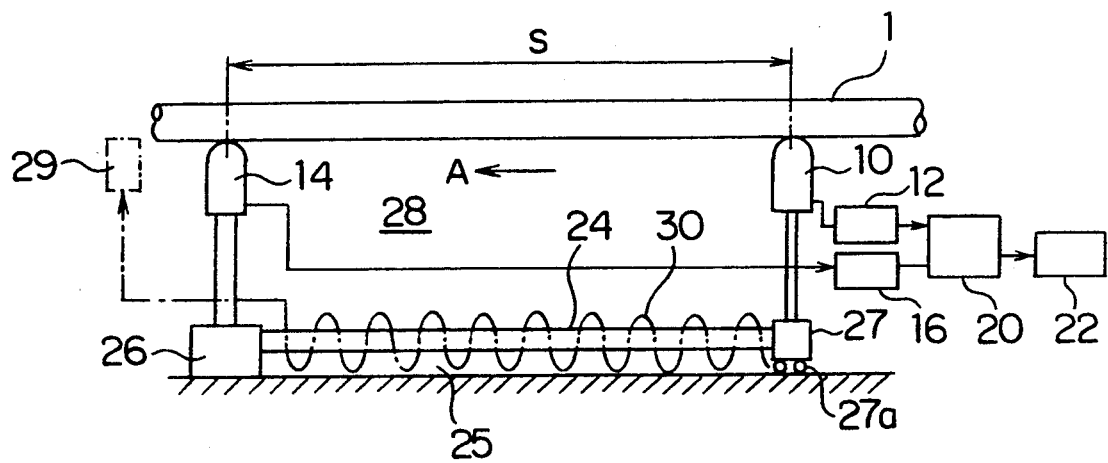
FIG. 2 is a view showing the partial construction of the length measuring apparatus shown in FIG. 1 as a second embodiment of the present invention.

FIG. 2 shows a partial construction of a length measuring apparatus of the marking system as a second embodiment of the present invention.

In the marking system shown in FIG. 1, the accuracy of the standard length measurement distance S is sought. However, due to changes in the ambient temperature of the length measuring apparatus, the coefficient of thermal expansion $\lambda_2$ of the carriage (not shown) supporting the magnetic recording head 10 and the magnetic reproduction head 14 and defining the standard length measurement distance S and the coefficient of thermal expansion $\lambda_1$ of the cable 1 usually differ, so there is the problem of a reduction in the precision of length measurement due to changes in the ambient temperature. For example, the count N of the counter 22 in the case where the standard length measurement distance at a room temperature of 0° C. is $S_o$ and the total length of the cable 1 is $L_o$ is given by the following equation:

$$N = L_o / S_o \quad (2)$$

The count N' of the counter 22 when the temperature T changes to $(T + \Delta T)$ becomes as follows:

$$\begin{aligned} N' &= [L_o(1 + \Delta T \lambda_1)] / [S_o(1 + \Delta T \lambda_2)] \\ &= N(1 + \Delta T \lambda_1)/(1 + \Delta T \lambda_2) \end{aligned} \quad (3)$$

That is, the count N' suffers from an error of $(1 + \Delta T \lambda_1)/(1 + \Delta T \lambda_2)$ due to the temperature change. The second embodiment of the present invention shown in FIG. 2 solves this problem.

The length measuring apparatus of FIG. 2 is part of the length measuring apparatus of FIG. 1 and has the magnetic recording head 10, the magnetic recording circuit 12, the magnetic reproduction head 14, the magnetic reproduction circuit 16, the length measuring apparatus body 20, and the counter 22. The apparatus also incorporates a length measuring head positioning apparatus 28 comprised of a fixing means 26 which is affixed to a floor 25 and supports the magnetic reproduction head 14, a heat expansion and contraction correction rod 24 which is connected to the fixing means 26, and a roller table 27 which is connected to the other end of the heat expansion and contraction correction rod and supports the magnetic recording head 10. In FIG. 2, omission is made of parts shown in FIG. 1 such as the magnetic tape 2, tape supply drum 3, tape adhering roller 4, backup roller 5, tape peeling roller 6, backup roller 7, and tape takeup drum 8.

The heat expansion and contraction correction rod 24 is fabricated by a material having substantially the same heat expansion as the coefficient of thermal expansion $\lambda_1$ of the cable 1 which is being measured for length. For example, if the material of the cable 1 is copper, use is made of a copper rod for the heat expansion and contraction correction rod 24 and it is set to a length of the standard length measurement distance S accurate at the reference temperature of, for example, 20° C. The side connected to the fixing means 26 of the heat expansion and contraction correction rod 24 is fixed in place, but the side connected to the roller table 27 is movable. When the heat expansion and contraction correction rod 24 expands due to a temperature change, the roller 27a at the bottom of the roller table 27 moves in accordance with that temperature change. Therefore, the standard length measurement distance defining the distance between the magnetic recording head 10 and the magnetic reproduction head 14 changes in accordance with temperature changes. The change in the standard length measurement distance corresponds to the expansion or contraction of the length of the cable 1 due to a change in temperature. Thus, temperature is automatically compensated for and accurate measurement of length becomes possible.

Further, the temperature of the cable 1 is detected by the temperature sensor 29 and the temperature difference with the heat expansion and contraction correction rod 24 or the difference in heat expansion or contraction may be corrected using a temperature control means and heating the heat expansion and contraction correction rod 24, so as to enable an even more accurate measurement of length.

Figure 3:
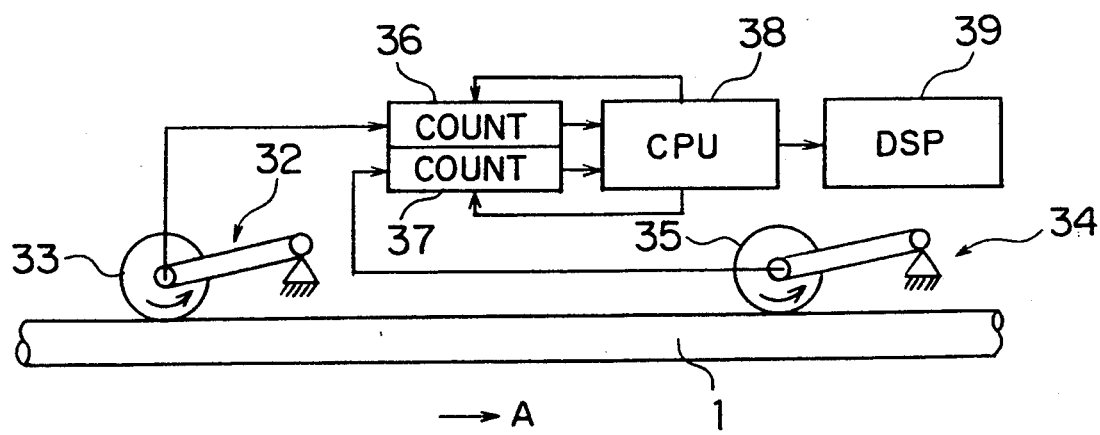
FIG. 3 is a view showing the construction of a length measuring apparatus of the encoder type as a third embodiment of the present invention.

An explanation will be made of a length measuring apparatus of the encoder system as a third embodiment of the present invention referring to FIG. 3.

The length measuring apparatus has a first encoder 32, a second encoder 34, a first counter 36, a second counter 37, a length measuring apparatus body 38 comprised by a CPU and a memory in the same way as the length measuring apparatus body 20 shown in FIG. 1, and an LCD or other display 39. The encoder wheels 33 and 35 of the first encoder 32 and the second encoder 34 contact the surface of the cable 1 at different positions along the direction of movement of the cable 1. If the cable 1 moves in the direction of the arrow A, the encoder wheels 33 and 35 will rotate and pulse signals corresponding to the distance of movement of the cable 1 will be output from the encoders 32 and 34 to the first counter 36 and the second counter 37. The first counter 36 and the second counter 37 count the pulse signals from the first encoder 32 and the second encoder 34 and show counts corresponding to the distance of movement of the cable 1.

Normally, the number of output pulses from the first encoder 32 and the number of output pulses from the second encoder 34 are equal. Therefore, the count of the first counter 36 and the count of the second counter 37 are normally equal. However, if one of the encoder wheels slips, the number of output pulses from the encoder will become smaller than the number of output pulses from the other encoder. As shown in this embodiment, the encoder wheels 33 and 35 are rotated at different positions of the cable 1, so there is very little chance of the encoder wheels 33 and 35 simultaneously slipping. Therefore, if a difference occurs in the counts of the first counter 36 or the second counter 37, it is considered that slipping has occurred at the one with the smaller count.

Therefore, the length measuring apparatus body 38 compares the count of the first counter 36 and the count of the second counter 37 at a certain period and when one count is smaller, outputs addition data corresponding to the difference of the count to the counter with the smaller count, for example, the first counter 36, so that it becomes equal to the other larger count. Thus, the apparatus controls the count of the first counter 36 to become equal to the count of the second counter 37. By this, even if slipping occurs in one of the encoder wheels 33 or 35, the error due to the slipping is quickly revised and error does not accumulate.

The length measuring apparatus body 38 displays on the display 39 the larger count of the counts of the first counter 36 and the second counter 37.

The positions where the encoder wheels 33 and 35 contact the cable 1 need only be separate in the longitudinal direction of the cable 1 and do not have to be on the same line in the longitudinal direction. Rather, for example, there is less chance of the same slipping occurring if the encoder wheels 33 and 35 are made to contact the surface of the cable 1 at separate positions in the longitudinal direction at positions shifted about 90 degrees about the cable 1.

The period of the comparison and correction of the counts of the first counter 36 and the second counter 37 performed by the length measuring apparatus body 38 preferably is short, but is suitably determined with consideration to the speed of movement of the cable 1, the time intervals of occurrence of pulses from the encoders 32 and 34, etc.

A fourth embodiment of the present invention will now be explained with reference to FIG. 4 to FIG. 10. This embodiment is of a length measuring apparatus combining the marking system and encoder system.

Figure 4:
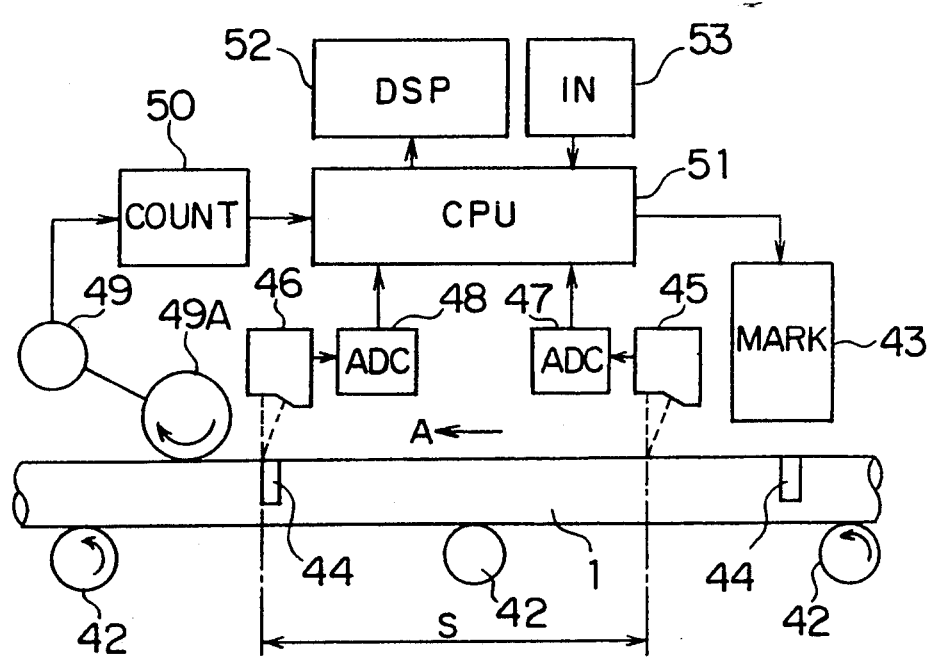
FIG. 4 is a view showing the construction of a length measuring apparatus as a fourth embodiment of the present invention.

FIG. 4 shows the construction of the length measuring apparatus. A plurality of conveyance rollers 42 support the cable i and convey the cable 1. These conveyance rollers 42 are used in the above embodiments as well, but illustrations thereof were omitted.

The length measuring apparatus shown in FIG. 4 has a marker 43 which provides a mark 44 in a narrow range on the surface of the moving cable 1, first and second sensors 45 and 46 which are arranged along the direction of movement A of the cable 1, and an encoder 49 with an encoder wheel 49A which contacts the surface of the cable 1.

The distance between the detection point 45a of the first sensor 45 and the detection point 46a of the second sensor 46 is the standard length measurement distance S, which standard length measurement distance S is normally about 1 to 3 meters.

As the marker 43, in this embodiment, use is made of one which gives an optically detectable mark, for example, a marker of the ink jet type or a marker of the stamp type.

As the first sensor 45 and the second sensor 46, use is made of a sensor which can detect an edge of a mark given by the marker 43 at a high precision, for example, a laser switch.

When the color of the surface of the cable 1 is "black", the marker 43 gives a white mark and the laser switches used as the first sensor 45 and the second sensor 46 discriminate the difference of the average reflectance of the marks subjected to the detection procedure, that is, the difference of the amount of light reflected during irradiation of a laser beam.

The length measuring apparatus has first and second analog/digital converters (ADC) 47 and 48 which convert the analog detection signals showing the amount of light reflected from the laser switches (i.e., the first and second sensors 45 and 46) into digital signals, a counter 50 which counts the position detection pulses from the encoder 49, and a length measuring apparatus body 51 which has a computer unit (CPU) and memory in the same way as the length measuring apparatus body 20. The length measuring apparatus body 38, which receives as input the digital signals from the ADC's 47 and 48 and the counter 50, performs length measuring processing, and outputs a marking command to the marker 43 in accordance with the length measuring processing. Further, the length measuring apparatus has a CRT, LCD, or other display device 52 which displays the results of the length measurement calculated by the length measuring apparatus body 51 and a keyboard or other input apparatus 53 for inputting the results of the length measurement mentioned later, performed by hand by a tape measure etc. at the start or the end of the length measuring operation, to the length measuring apparatus body 51.

The operation of the length measuring apparatus shown in FIG. 4 will be explained now with reference to FIGS. 5a to 5f.

Figure 5A:
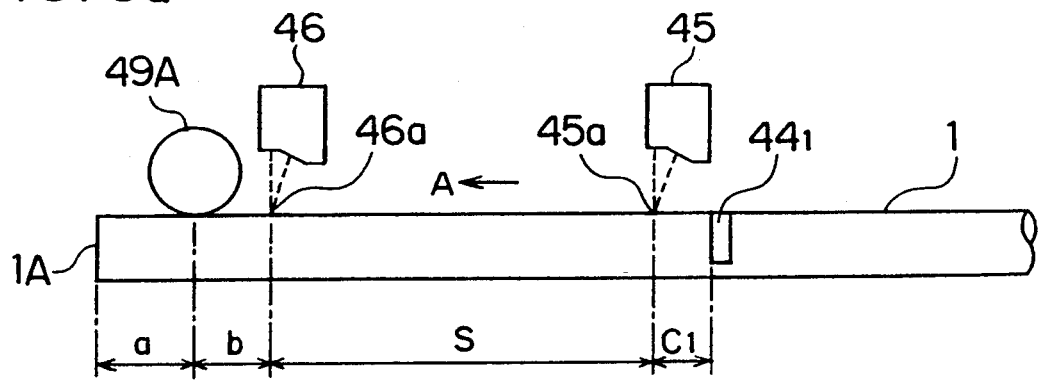
FIGS. 5a to 5f are views for explaining the operation of the length measuring apparatus shown in FIG. 4.

The operation shown in FIG. 5a is performed at the time of the start of the length measurement when there is no movement of the cable 1.

The distance a from the front end 1A of the cable i to the encoder wheel 49A in contact with the surface of the cable 1 and the distance b from the encoder wheel 49A to the detection point 46a of the second sensor 46 are measured by a tape measure etc. and input to the length measuring apparatus body 51 through the input apparatus 53 for storage in the memory in the length measuring apparatus body 51. These distances (a+b) are displayed on the display device 52 from the length measuring apparatus body 51.

If a length measuring command is given to the length measuring apparatus body 51 in this state, the length measuring apparatus body 51 outputs a marking command to the marker 43 and the marker 43 gives a first mark $44_1$ to the surface of the cable 1. The interval from the position of the first mark $44_1$ at this time to the detection point 45a of the first sensor 45 is used as the distance $C_1$. As mentioned above, the distance from the detection point 45a of the first sensor 45 to the detection point 46a of the second sensor 46 is the standard length measurement distance S.

When the length measuring apparatus body 51 outputs a marking command to the marker 43, it outputs a conveyance command to a cable transport mechanism (not shown) including a conveyance roller 42 for the cable 1 to operate the same and move the cable 1 in the arrow direction A.

Figure 5B:
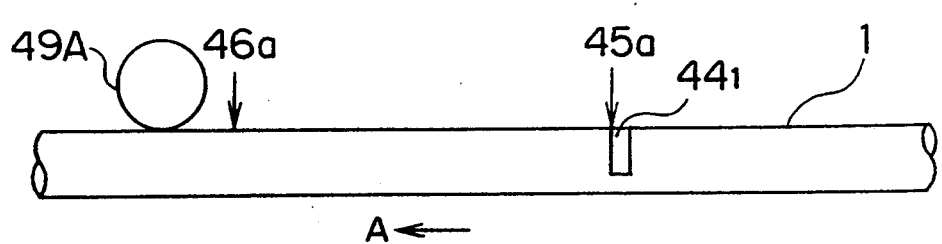

As shown in FIG. 5b, when the first mark $44_1$ reaches the detection point 45a of the first sensor 45, the first sensor 45 detects the edge of the mark $44_1$. The results of the detection by the first sensor are input to the length measuring apparatus body 51 through the first ADC 47. The distance of movement of the cable 1 is detected by the encoder wheel 49A, with the pulse output of the encoder 49 counted by the counter 50. The length measuring apparatus body 51 inputs the count of the counter 50 when the detection signal from the first ADC 47 is input and then immediately clears the counter 50 to "0". The length measuring apparatus body 51 multiplies the inputted count by a predetermined conversion coefficient to calculate the distance $C_1$ and stores the distance $C_1$ in a memory.

The distances a and b are already given to the length measuring apparatus body 51 through the input apparatus 53, so that the length measuring apparatus body 51 calculates the distance $(a+b+C_1)$, stores it in the memory, and displays the calculated distance on the display device 52.

Figure 5C:
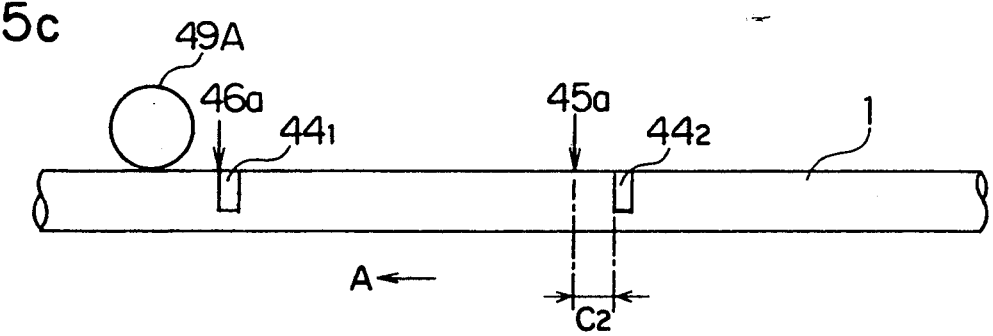

As shown in FIG. 5c, when the cable 1 is further moved and the first mark $44_1$ reaches the detection point 46a of the second sensor 46, the second sensor 46 detects the edge of the mark $44_1$. The detection signal of the second sensor 46 is input through the second ADC 48 to the length measuring apparatus body 51. When the edge of the first mark $44_1$ is detected by the second sensor 46, it means the cable has moved by exactly the standard length measurement distance S. Therefore, the length measuring apparatus body 51 updates the count by 1 showing that a standard length measurement distance S has been measured and stores the results of the count in the memory. Note that the counting of the standard length measurement distance S is performed by renewing an address in the memory and the value of the memory address is initialized as "0" at the time of start of the length measurement.

The length measuring apparatus body 51 calculates the distance $(a+b+C_1+1 \cdot S)$ and displays the calculated distance on the display device 52.

Along with the count and the display, the length measuring apparatus body 51 outputs the next marking command to the marker 43 and makes the marker 43 give a second mark $44_2$ to the surface of the cable 1.

The distance between the position of the second mark $44_2$ at this time and the detection point 45a of the first sensor 43 is used as the surplus length $C_2$.

Note that the surplus length means the difference between the standard length measurement distance S and the adjoining marks on the surface of the cable 1 or a tape transported along with the cable 1. This surplus length is usually several percent of the standard length measurement distance S.

Figure 5D:
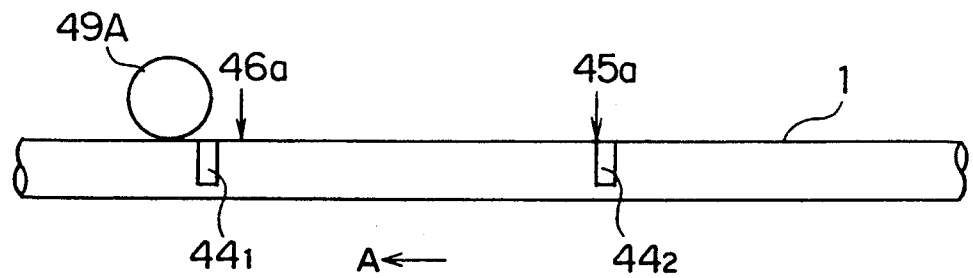

As shown in FIG. 5d, when the edge of the second mark $44_2$ reaches the detection point 45a of the first sensor 45, the first sensor 45 detects the edge of the mark $44_2$ and the detection results are output through the first ADC 47 to the length measuring apparatus body 51. During the movement of the cable 1, the encoder 49 detects the distance of movement of the cable 1 and the results are counted by the counter 50. When a detection signal from the first ADC 47 is input, the length measuring apparatus body 51 inputs the count of the counter 50 and multiplies it by a predetermined conversion coefficient so as to calculate the distance (surplus length) $C_2$ and makes the count of the counter 50 "0". The length measuring apparatus body 51 adds the distance $C_1$ stored in the memory and the surplus length $C_2$. Note that for convenience sake, the distance $C_1$ is also referred to as the first surplus length.

The length measuring apparatus body 51 calculates the distance $(a+b+S+(C_1+C_2))$, stores it in the memory, and displays it on the display device 52.

Figure 5E:
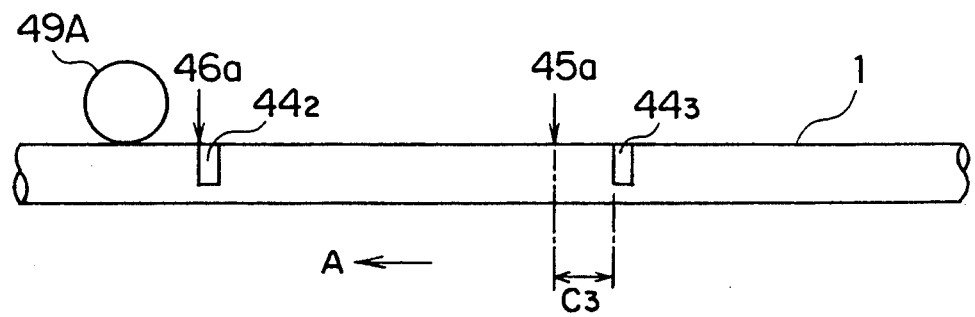

As shown in FIG. 5e, when the edge of the second mark $44_2$ reaches the detection point 46a of the second sensor 46, the second sensor 46 detects the edge of the second mark $44_2$. The detection signal is input through the second ADC 48 to the length measuring apparatus body 51. In the same way as above, since the cable 1 moves by exactly the standard length measurement distance S, the length measuring apparatus body 51 advances the count of the distance in the memory by 1 to make it 2. Along with this count operation, the length measuring apparatus body 41 outputs a marking command to the marker 43 to give a third mark $44_3$.

The distance between the position of the third mark $44_3$ at this time and the detection point 45a of the first sensor 45 is used as the surplus length $C_3$.

The length measuring apparatus body 51 calculates the distance $(a+b+2S+(C_1+C_2))$, stores it in the memory, and displays the calculated distance on the display device 52.

The length measurement operation explained above with reference to FIG. 5b to FIG. 5e is performed repeatedly.

Figure 5F:
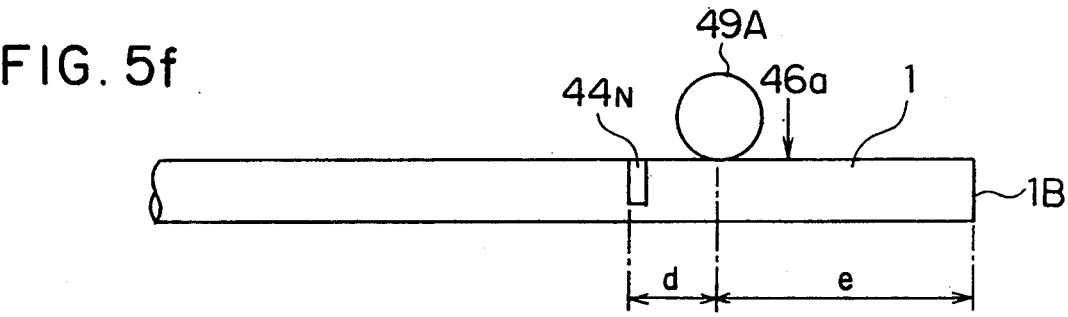

As shown in FIG. 5f, the length $L2_1$ of the cable i when the N-th mark $44_N$ passes the detection point 46a of the second sensor 46 and the length measurement is ended becomes as follows since the count of the memory in the length measuring apparatus body 51 becomes N:

$$L2_1 = a + b + N \cdot S + \sum_{i=1}^{N} C_i \quad (4)$$

In FIG. 5f, when the movement of the cable 1 stops, the worker uses a tape measure etc. to measure the distance d from the mark $44_N$ to the point of contact of the encoder wheel 49A with the surface of the cable 1 and the distance e from the position of contact of the encoder wheel 49A with the surface of the cable 1 to the end 1B of the cable 1 and inputs these distances from the input apparatus 53 to the length measuring apparatus body 51.

The length measuring apparatus body 51 adds these input distances d and e to calculate the following distance $L2_2$:

$$L2_2 = a + b + N \cdot S + \sum_{i=1}^{N} C_i + d + e \quad (5)$$

The length of the cable 1 is determined from the above.

As mentioned above, the surplus lengths $C_i$ measured by the encoder are shorter than the standard length measurement distance S (usually about several percent of the same), so the measurement error of the encoder is relatively small.

Further, the measurement of the standard length measurement distance S by the marking system and the surplus length measurement by the encoder system may be combined so that even if the speed of movement of the cable 1 fluctuates, accurate measurement of the length becomes possible without relying on the change of speed of the cable 1 by the combination.

Next, an evaluation will be made of the precision of the length measurement.

The precision of measurement of the encoder 49 is $\pm\epsilon$, where $\epsilon$ is about 1 percent.

The distances a, b, d, and e measured by the above operation are out of the scope of automatic measurement by the length measuring apparatus, and thus are removed from the scope of evaluation of precision. By this, the distance of measurement L3 covered by the evaluation of precision is expressed by the following equation:

$$L3 = N \cdot S + \sum_{i=1}^{N} C_i \quad (6)$$

If the measurement error by the above length measuring apparatus is E, the following equation stands:

$$E \pm \left[ \epsilon \cdot \sum_{i=1}^{N} C_i \right] = \sum_{i=1}^{N} \Delta S_i \quad (7)$$

The distance $\Delta S_i$ shows the difference between the distance $S'$ of actual movement of the cable 1 and the standard length measurement distance S in the interval from when the edge of the i-th mark $44_i$ is detected by the first sensor 45 to when it is detected by the second sensor 46. The magnitude of the distance $\Delta S_i$ usually depends on the precision of detection of the mark edge by the sensors 45 and 46. When laser switches are used for these sensors, the precision of detection is about 0.01 mm. Therefore, the distance $\Delta S_i$ is usually on the order of several tens of microns.

If the precision of measurement of the length measuring apparatus of this embodiment is $\beta$, then the following equation stands:

$$\beta = \pm \left[ \epsilon \sum_{i=1}^{N} C_i \right] = \sum_{i=1}^{N} \Delta S_i \quad (8)$$

Since $$\sum_{i=1}^{N} \Delta S < \left[ \epsilon \sum_{i=1}^{N} C_i \right]$$

$\beta$ is expressed by the following equation:

$$\beta = \pm \left[ \epsilon \sum_{i=1}^{N} C_i \right] / \left[ \sum_{i+1}^{N} C_i + NS \right] \quad (9)$$

Further, since $$(N \cdot S) > \sum_{i=1}^{N} C_i$$

$\beta$ may be expressed by the following equation:

$$\beta = \pm \left[ \epsilon \sum_{i=1}^{N} C_i \right] / (NS) \quad (10)$$

$$= \pm \epsilon \left[ \sum_{i=1}^{N} C_i / (NS) \right]$$

For example, if $$\left[ \sum_{i=1}^{N} C_i / (NS) \right] = 1/100$$

then $$\beta = \pm (\epsilon/100)$$

As mentioned above, in this embodiment, use is made of the high measurement precision marking system for measurement of long lengths (N·S) and use is made of the encoder system for measurement of short lengths from the position given a mark to the detection point $45a$ of the first sensor 45, that is, measurement of the surplus length $C_i$, so the length is measured at a high precision. Further, according to this embodiment, it is possible to measure the length of cables with a high precision without dependence on the change of speed of movement of the cable 1. Further, since the first sensor 45 is provided, the position when the mark is given is measured, and the variation in the distances between adjoining marks is measured by the encoder system, the problem of the marking system is alleviated.

In the above embodiment, the counter 50 which counts the pulse signals from the encoder every time the cable 1 is transported by the standard length measurement distance S is cleared to "0" and the count of the distances corresponding to the surplus length is started from "0", so the counter 50 does not have to be cleared with each length measurement processing and just the difference between the previous count and the current count may be calculated.

Further, in the above embodiment, the explanation was made of the case using of an encoder as a surplus length measuring means, but the surplus length may be measured by an apparatus which can measure the distance of movement of the cable 1 continuously. For example, use may be made of a laser type movement distance measurement apparatus using the Doppler effect or the laser type movement distance measurement apparatus using a spectral pattern. In the following explanation, illustration is given of an encoder as a continuous movement distance means, but of course these laser type movement distance measurement apparatuses may also be applied.

The length measuring apparatus of a fifth embodiment of the present invention will now be explained with reference to FIG. 6 and FIG. 7a to 7i.

Figure 6:
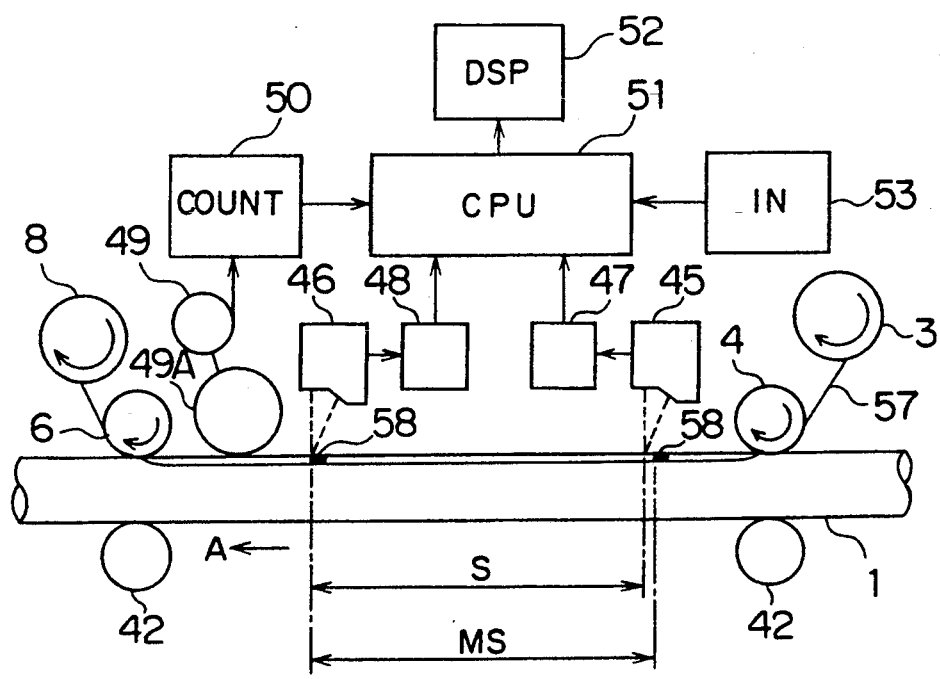
FIG. 6 is a view showing the construction of a length measuring apparatus of a fifth embodiment of the present invention.

FIG. 6 shows the constitution of a length measuring apparatus of this embodiment. This length measuring apparatus is an improvement over the length measuring apparatus shown in FIG. 4.

Before the automatic length measuring operation, as shown in FIG. 6, the tape 57 is made to adhere to the surface of the cable 1 and, further, a mark 58 is made at mark intervals MS between the tape adhering roller 4 and the tape separation roller 6. This mark interval MS may sometimes be longer than the standard length measurement distance S, as shown in FIG. 6, and may sometimes be shorter, as will be mentioned later.

Figure 7A:
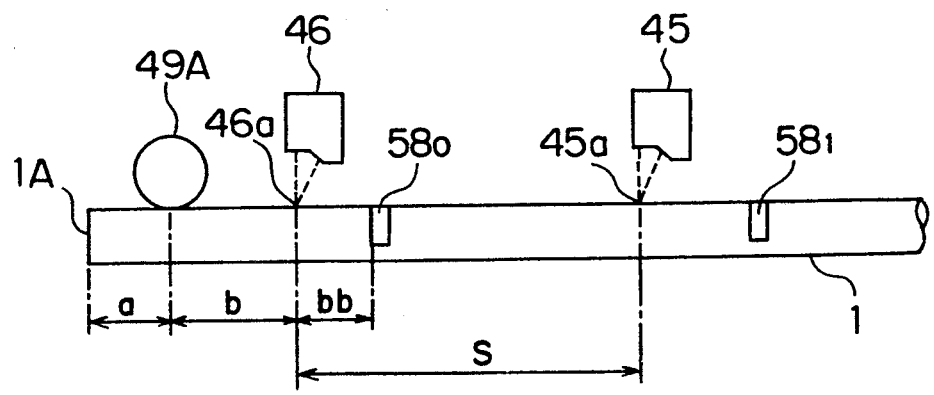
FIGS. 7a to 7i are views for explaining the operation of the length measuring apparatus shown in FIG. 6.

As shown in FIG. 7a, the mark $58_o$ between the detection point $45a$ of the first sensor 45 and the detection point $46a$ of the second sensor 46 is used as the starting mark.

As explained regarding the fourth embodiment with reference to FIG. 5a, the distance a from the front end 1A of the cable 1 to the encoder wheel 49A, the distance b from the encoder wheel 49A to the detection point $46a$ of the second sensor 46, and the distance bb from the detection point $46a$ of the second sensor 46 to the starting mark $58_o$ are measured by a tape measure etc. and stored in a memory in the length measuring apparatus body through the input apparatus 53.

If an automatic length measuring start command is given to the length measuring apparatus body 51, the length measuring apparatus body 51 initializes the counter counting the number of standard length measurement distances S in the memory to "0", outputs a conveyance command to the cable conveyance mechanism, and moves the cable i via the conveyance roller 42. Along with this movement, the tape 57 is adhered to the surface of the cable 1 by the tape adhering roller 4 and moved along with the cable 1, is peeled from the surface of the cable 1 by the tape peeling roller 6, and is wound up by the tape windup drum 8.

Along with the movement of the cable 1, the encoder wheel 49A rotates and pulse signals corresponding to the rotation are output from the encoder 49 to the counter 50 so that the counter 50 counts the number of pulses in accordance with the distance of movement of the cable 1.

Figure 7B:
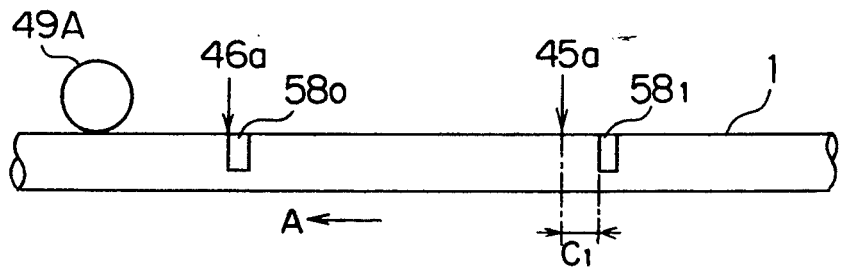

As shown in FIG. 7b, if the cable 1 moves by exactly the distance bb, the edge of the starting mark $58_o$ reaches the detection point $46a$ of the second sensor 46. The second sensor 46 detects the edge of the starting mark $58_o$ and outputs the mark detection signal to the length measuring apparatus body 51 through the second ADC 48. The length measuring apparatus body 51 receives as input the count of the counter 50 counting the pulse signals from the encoder 49. The count of the counter 50 shows the distance bb. The length measuring apparatus body 51 calculates the distance (a+b+bb), stores it in the memory, and displays the distance calculated in the display device 52.

Figure 7C:
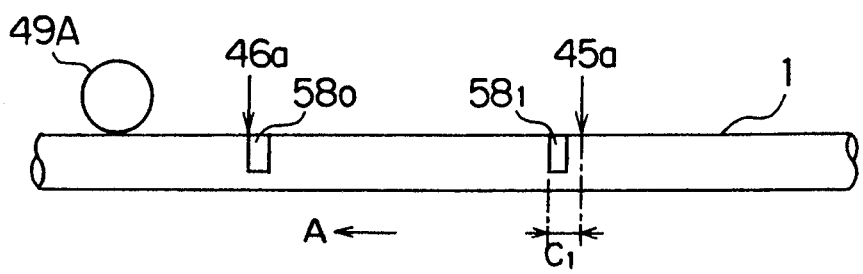

Depending on whether the mark interval MS is longer or shorter than the standard length measurement distance S, the state shown in FIG. 7b or FIG. 7c occurs. When the mark interval MS is longer than the standard length measurement distance S, as shown in FIG. 7b, the difference in the distance between the mark interval MS and the standard length measurement distance S, the surplus length $C_1$, is after the detection point $45a$ of the first sensor 45 and before the first mark $58_1$. Conversely, the surplus length $C_1$ has the reverse positional relationship as shown in FIG. 7c.

The measurement of the surplus length $C_1$ is explained below.

In the case shown in FIG. 7b, the count SC2 of the counter 50 when the edge of the starting mark $58_o$ is detected by the second sensor 46 is input into the length measuring apparatus body 51 and stored in the memory. Next, the count SC1 of the counter 50 when the edge of the first mark $58_1$ is detected by the first sensor 45 is input to the length measuring apparatus body 51 and stored in the memory. Then, the length measuring apparatus body 51 performs the following operation and calculates the surplus length $C_1$.

$$C_1 = (SC1 - SC2) \cdot P \tag{11}$$

where, P is the distance of movement of the cable 1 per pulse of the encoder 49.

The surplus length C1 is a positive value.

In the case in FIG. 7c, the count SC1 of the counter 50 when the edge of the first mark $58_1$ is detected by the first sensor 45 is stored in the memory by the length measuring apparatus body 51. Next, the count SC2 of the counter 50 when the edge of the starting mark $58_o$ is detected by the second sensor 46 is stored in the memory and the same operation as in the above-mentioned equation 21 is performed. The surplus length $C_1$ in this case is a negative value.

The thus calculated surplus length $C_1$, as explained later, is added for correction of the standard length measurement distance S when the edge of the first mark $58_1$ reaches the detection point 46a of the second sensor 46 and the length measurement on the first standard length measurement distance S is ended.

Usually, each time the second sensor 46 detects the mark 58, the measurement and calculation of the standard length measurement distance S are performed and the count in the memory is changed by 1 count each, but in this embodiment even if the starting mark $58_o$ is detected by the second sensor 46, the above-mentioned count processing is not performed and the count in the above-mentioned memory is changed when the first mark $58_1$ is detected by the second sensor 46.

Figure 7D:
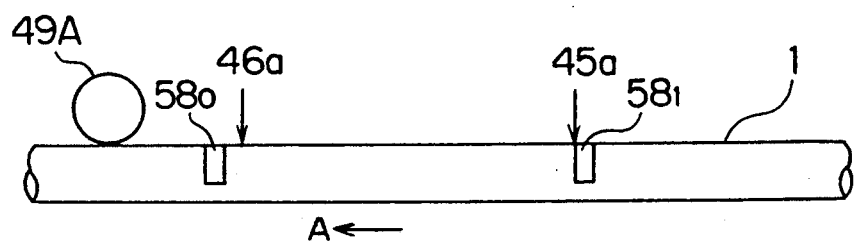
Figure 7E:
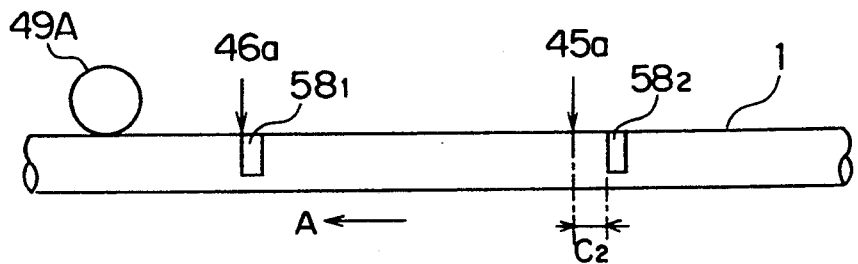
Figure 7F:
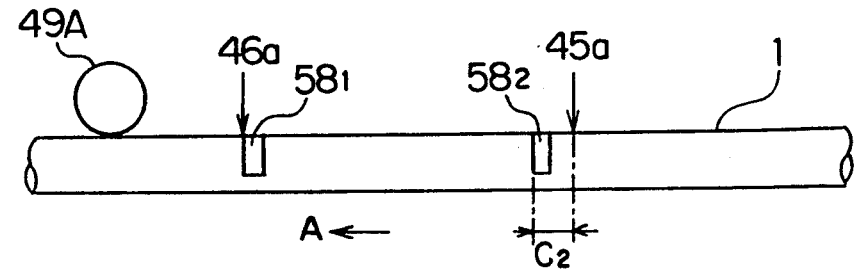

When the cable 1 moves further from the position shown in FIG. 7d, the state becomes that shown in FIG. 7e or FIG. 7f in the same way as in FIG. 7b or FIG. 7c. The measurement of the surplus length $C_2$ of the difference between the standard length measurement distance S at that time and the mark interval MS is performed by the same processing as explained with reference to FIG. 7c.

Note that when the first mark $58_1$ is detected by the second sensor 46, the surplus length $C_1$ is corrected by the length measuring apparatus body 51 and the length $L3_1$ of the cable at that time is shown by the following equation:

$$L3_1 = a + b + bb + C_1 + 1 \cdot S \qquad (12)$$

The length $L3_1$ is stored in the memory and displayed on the display device 52.

Figure 7G:
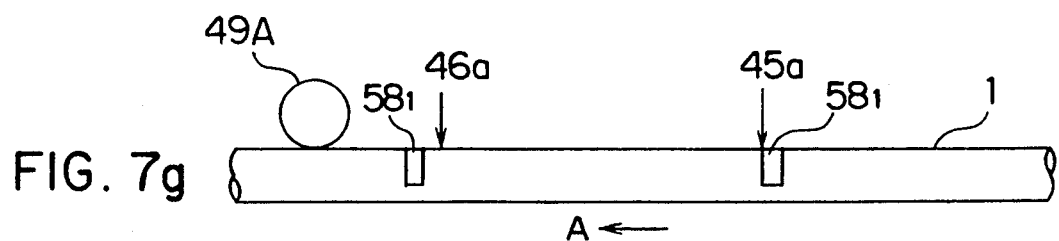
Figure 7H:
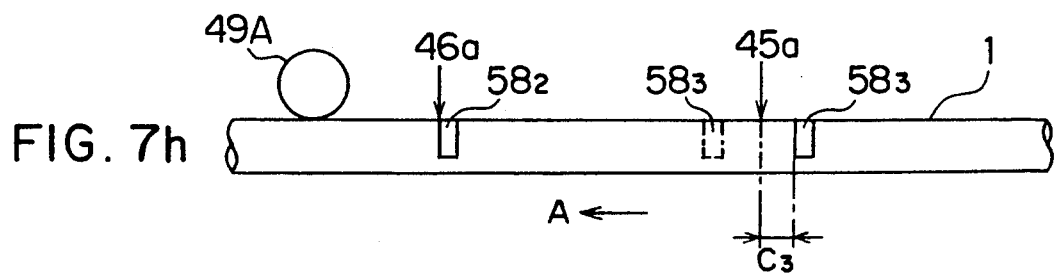

Even when the cable 1 moves from the state shown in FIG. 7g to the state shown in FIG. 7h, the same applies as the move from the state shown in FIG. 7d to the state shown in FIG. 7e or FIG. 7f. FIG. 7h shows the mark $58_3$ shown by the broken line and the mark $58_3$ shown by the solid line. FIG. 7e shows the two states of FIG. 7f.

The length $L3_2$ of the cable 1 when the edge of the second mark $58_2$ is detected by the second sensor 46 is shown by the following equation:

$$L3_2 = a + b + bb + C_1 C_2 + 2 \cdot S \qquad (13)$$

The length $L3_2$ is stored in the memory and displayed on the display device 52.

Figure 7I:
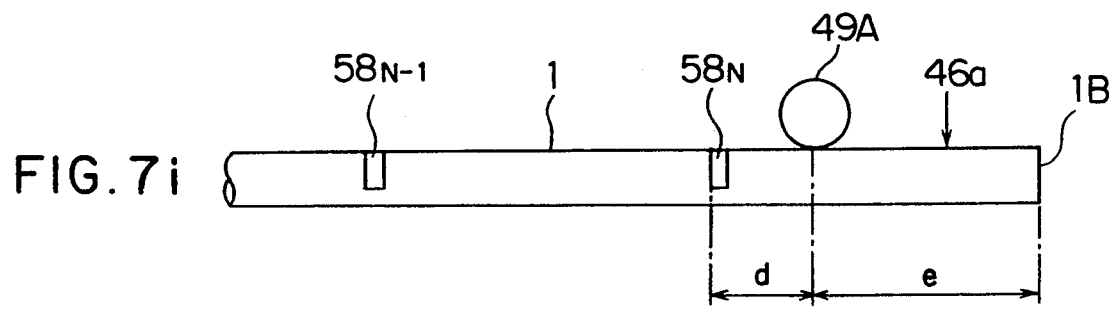

The above measurement operation is repeated. As shown in FIG. 7i, the length $L3_3$ of the cable 1 when the edge of the N-th mark $58_N$ is detected by the second sensor 46 is as follows:

$$L3_3 = a + b + bb + \sum_{i=1}^{N} C_i + N \cdot S \qquad (14)$$

As explained above, at the time of the end of the automatic length measurement, the distance d between the mark $58_N$ and the encoder wheel 49A and the distance e between the encoder wheel 49A and the final end portion 1B of the cable 1 are measured by a tape measure etc. and input through the input apparatus 53 to a length measuring apparatus body 51, whereby it becomes possible to find the final length $L3_4$ of the cable 1 by the following equation:

$$L3_4 = a + b + bb + \sum_{i=1}^{N} C_i + N \cdot S + d + e \qquad (15)$$

The evaluation of the precision in the embodiment is the same as the above-mentioned evaluation of precision.

This embodiment uses a tape 57 given marks in advance at the mark intervals MS, and thus can measure even distances shorter than the standard length measurement distance S and improve the precision of the length measurement. Further, since marks are given in advance to the tape 57, there is no need for provision of the marker 43 shown in FIG. 4 and after the detection of the mark by the sensor 46, processing for driving the marker 43 for marking becomes unnecessary, so there is no reduction of the precision of the length measurement along with this time delay.

Note that the tape 57 given the optically detectable marks can be replaced by the magnetic tape 2 used in the first embodiment shown in FIG. 1. In this case, marks are given to the magnetic tape 2 at the above-mentioned mark intervals MS and the sensors 45 and 46 and the ADC's 47 and 48 are replaced by ones corresponding to the magnetic reproduction head 14 and the magnetic reproduction circuit 16. In this modification as well, the same type of effect can be obtained.

The length measuring apparatus of the present invention will be explained with reference to FIG. 8 and FIGS. 9a to 9d.

Figure 8:
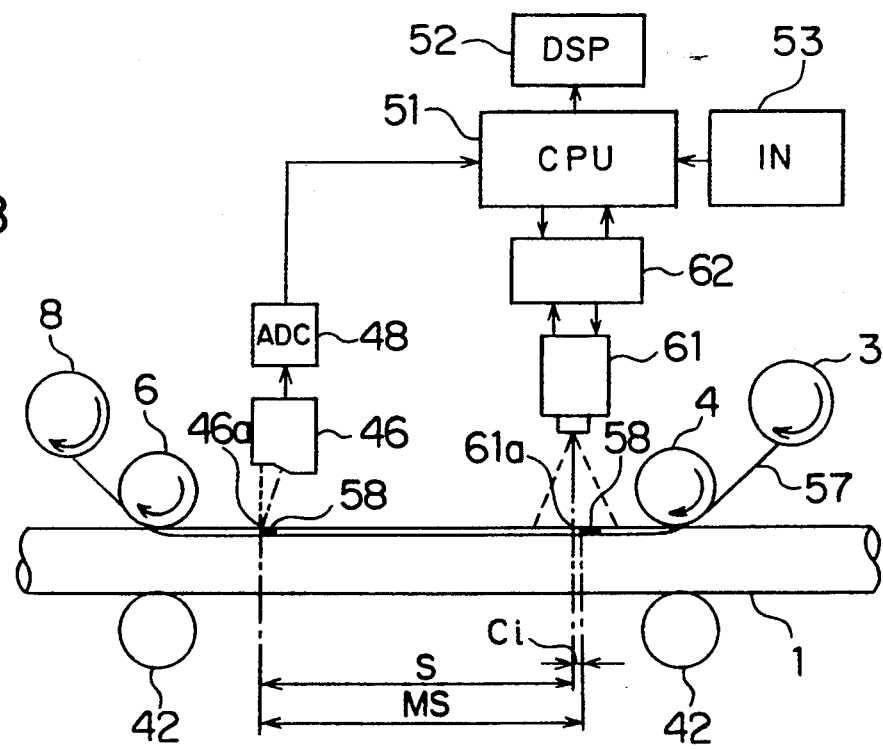
FIG. 8 is a view showing the construction of a length measuring apparatus as a sixth embodiment of the present invention.

The length measuring apparatus shown in FIG. 8 is one where the first sensor 45 of the length measuring apparatus shown in FIG. 6 is replaced by an image camera 61 using a charge coupled device (CDD) and the first ADC 47 is replaced by an image camera signal processing circuit 62. Further, the encoder 49 and the counter 50 of FIG. 6 are eliminated. The other parts of the structure are the same as in FIG. 6.

In this embodiment too, the distance between the center position of detection 61a of the image camera and the detection point 46a of the second sensor 46 is the standard length measurement distance S and marks 58 are given to the adhesive tape 57 at mark intervals MS.

FIGS. 9a to 9d will be referred to for an explanation of the operation of the length measuring apparatus.

Figure 9A:
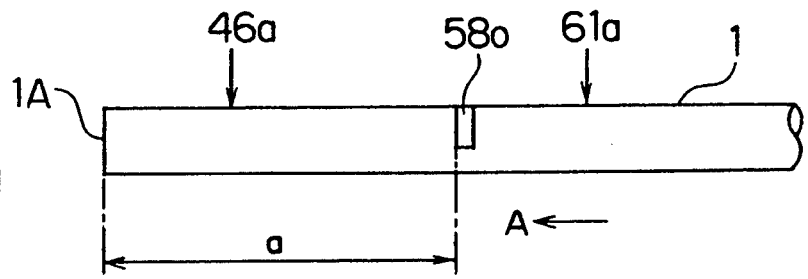
FIGS. 9a to 9d are views for explaining the operation of the length measuring apparatus shown in FIG. 8.

As shown in FIG. 9a, before the automatic length measurement, the distance a from the end face 1A of the cable 1 to the starting mark $58_o$ is measured by a tape measure etc. and the distance a is input through an input apparatus 53 to the length measuring apparatus body 51. The length measuring apparatus body 51 stores the input distance in the memory.

When the length measurement start command is given to the length measuring apparatus body 51, the length measuring apparatus body 51 starts the movement of the cable 1 through the cable conveyance mechanism. By this, the cable 1 moves in the arrow direction A and the tape 57 moves along with the cable 1.

Figure 9B:
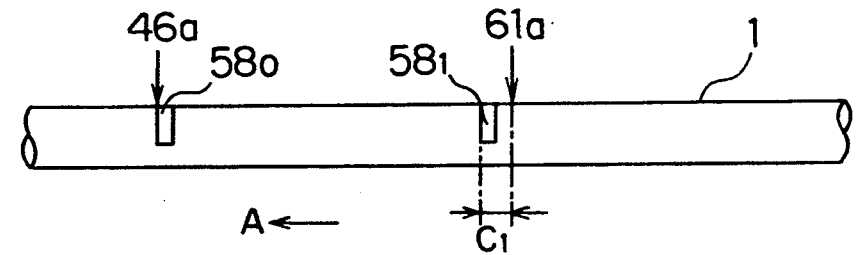

If the cable 1 is moved to the position shown in FIG. 9b, the edge of the starting mark $58_o$ is detected by the second sensor 46 and the detection signal is input to the length measuring apparatus body 51 through the second sensor ADC 48. The length measuring apparatus body 51 displays the above-mentioned input distance a on the display device 52. Further, simultaneously, the length measuring apparatus body 51 outputs a length measurement command to the image camera signal processing circuit 62 and an image camera 61 with a wide field of vision shoots the image in the scope of the surroundings of the center of orientation. The photographed information is input to the image camera signal processing circuit 62, and the surplus length $C_1$ showing the deviation of the first mark $58_1$ with respect to the center line of the direction of orientation of the image camera 61 is detected as the interval between input image points. For example, the surplus length $C_1$ is detected based on the following equation:

$$C_1 = (\chi_{SE} - \chi_C) \cdot P \tag{16}$$

where, $\chi_{SE}$ is the order of the pixel of the detection position of the i-th mark $58_i$, $\chi_{SE}$ is the position of the pixel of the detection position $61a$ of the image camera, and P indicates the distance between adjoining pixels.

Figure 9C:
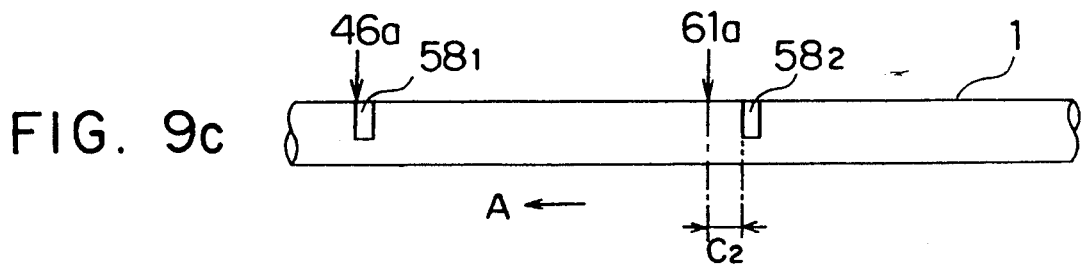
Figure 9D:
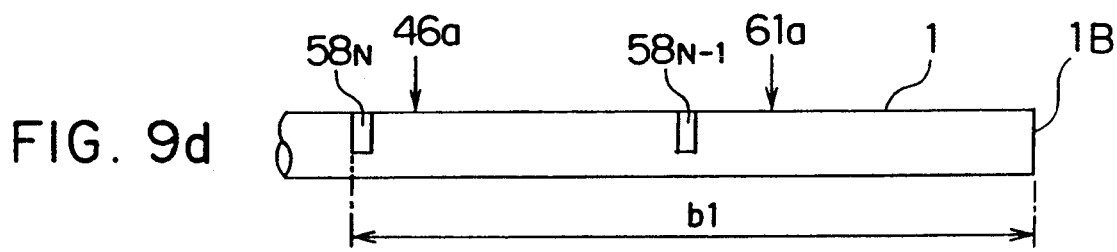

As shown in FIG. 9c, when the edge of the first mark $58_1$ reaches the detection point $46a$ of the second sensor 46, the length measuring apparatus body 51 increments by exactly 1 the count N in the memory, which has an initial value of "0", to make N=1, in accordance with the detection signal from the second sensor 46. At this time, the length measuring apparatus body 51 detects the surplus length $C_2$ as explained above through the image camera 61 and the image camera signal processing circuit 62 and stores the value in the memory. The length measuring apparatus body 51 calculates the distance of movement L4 of the cable up to then as $(a + 1 \cdot S + C_1)$ and displays the same on the display device 52.

A similar length measurement operation is repeated. In the state shown in FIG. 9d, the distance b1 between the rear end 1B of the cable 1 and the mark $58_N$ is measured by a tape measure etc. and is input through an input apparatus 53 to the length measuring apparatus body 51. By this, the length L4 of the cable 1 calculated by the length measuring apparatus body 51 is expressed by the following equation:

$$L4 = a + b1 + \sum_{i=1}^{N} C_i + N \cdot S \tag{17}$$

According to this embodiment, it is possible to measure the distance of deviation with the mark 58 directly after by the image camera 61 and the image camera signal processing circuit 62.

The tape 57 can be replaced by a magnetic tape 2, in the same way as explained with respect to the fifth embodiment.

Further, in place of the image camera 61 and the image camera signal processing circuit 62, a laser beam may be caused to rotate at high speed by a rotating mirror for scanning so as to detect the above-mentioned surplus length $C_i$. The surplus length $C_i$ at this time is calculated by the following equation:

$$C_i = (t_{SE} - t_c) \cdot Q \tag{18}$$

where, $t_{SE}$ is the time when the i-th mark $58_i$ is detected.

$t_c$ is the time when the standard length measuring position is detected, and

Q is the scanning speed.

A seventh embodiment will be explained now with reference to FIG. 10 and FIGS. 11a to 11f.

Figure 10:
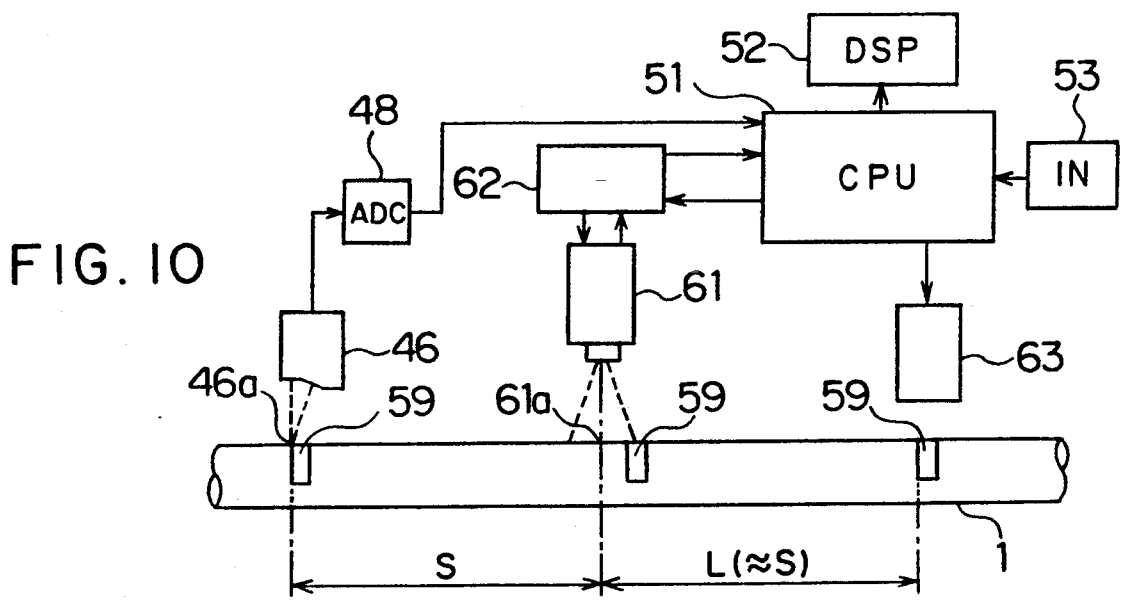
FIG. 10 is a view showing the construction of a length measuring apparatus as a seventh embodiment of the present invention.

The length measuring apparatus shown in FIG. 10 is an improvement of the length measuring apparatus shown in FIG. 8. The tape 57 and members 4, 5, 6, and 8 for adhering the tape 57 to the cable 1 and then peeling it off, shown in FIG. 8, are eliminated, and the marker 63 corresponding to the marker 43 shown in FIG. 4 is provided.

This embodiment, instead of the marks 58 provided on the tape 57 shown in FIG. 8, has a marker 63 driven by a length measuring apparatus body 51 that make marks 59 on the surface of the cable 1 each time the second sensor 46 comprised of a laser switch detects the mark 63. The operational processing of the image camera 61 and the image camera signal processing circuit 62 for detecting the deviation between the marks 59 and the standard length measurement distance S is the same as in the case of the sixth embodiment.

Figure 11A:
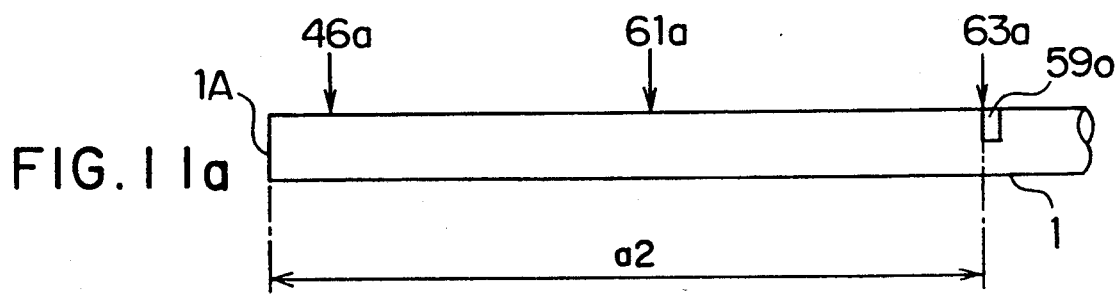
FIGS. 11a to 11f are views for explaining the operation of the length measuring apparatus shown in FIG. 10.
Figure 11B:
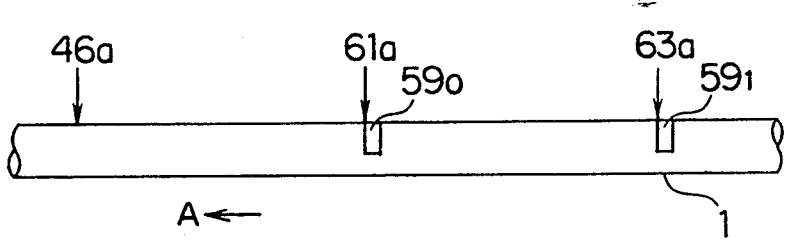
Figure 11C:
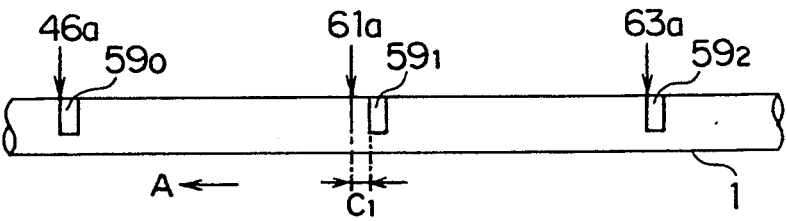
Figure 11D:
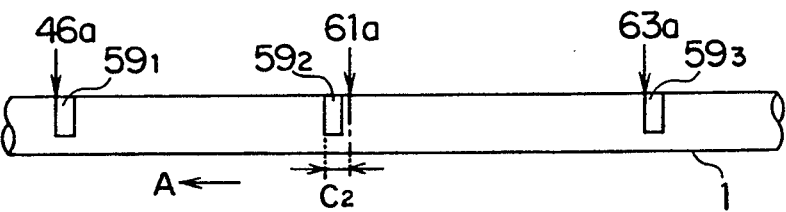
Figure 11E:
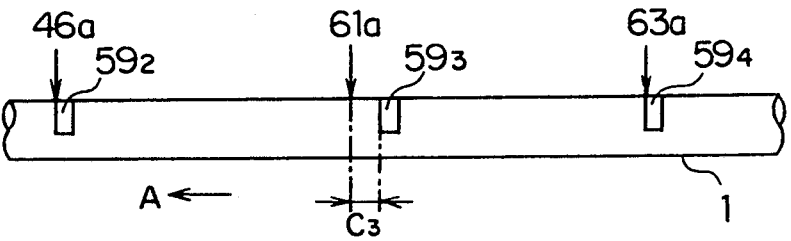
Figure 11F:
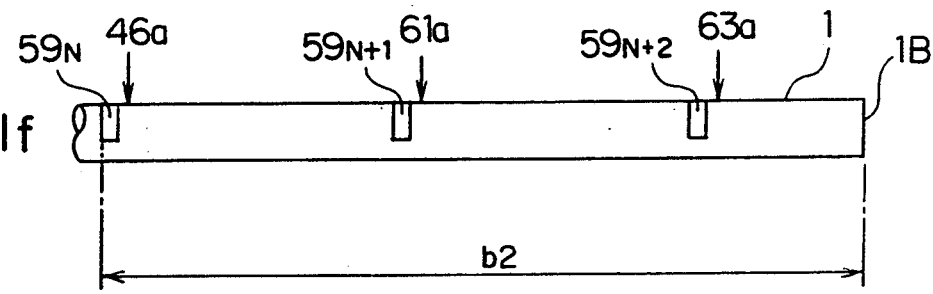

FIGS. 11a to 11f illustrate the operational processing of the length measuring apparatus, but the operation is the same as in the sixth embodiment with the exception of the manual measurement of the distance a from the end 1A of the cable 1 in the initial state show in FIG. 11a to the starting mark $59_0$ and the manual measurement of the distance b2 from the mark $59_N$ shown in FIG. 11f to the rear end 1B of the cable 1.

In this embodiment too, in place of the image camera 61 and the image camera signal processing circuit 62, it is possible to use the scanning system where a laser beam is made to rotate at a high speed by a rotating mirror.

An eighth embodiment of the present invention will be explained with reference to FIG. 12 to FIG. 15.

In the length measuring apparatus shown in FIG. 1, FIG. 4, and FIG. 10, after the second sensor detects a mark, a marker makes optically detectable marks on the surface of the moving cable 1 or magnetic marks on a magnetic tape 2. However, if the speed of movement of the cable becomes very high, a time lag occurs from when the second sensor detects the marks to when the marker makes a mark, and if the standard length measurement distance S between the first and the second sensors is fixed and the computation of the length is performed, measurement error occurs. This embodiment resolves this problem.

Figure 12:
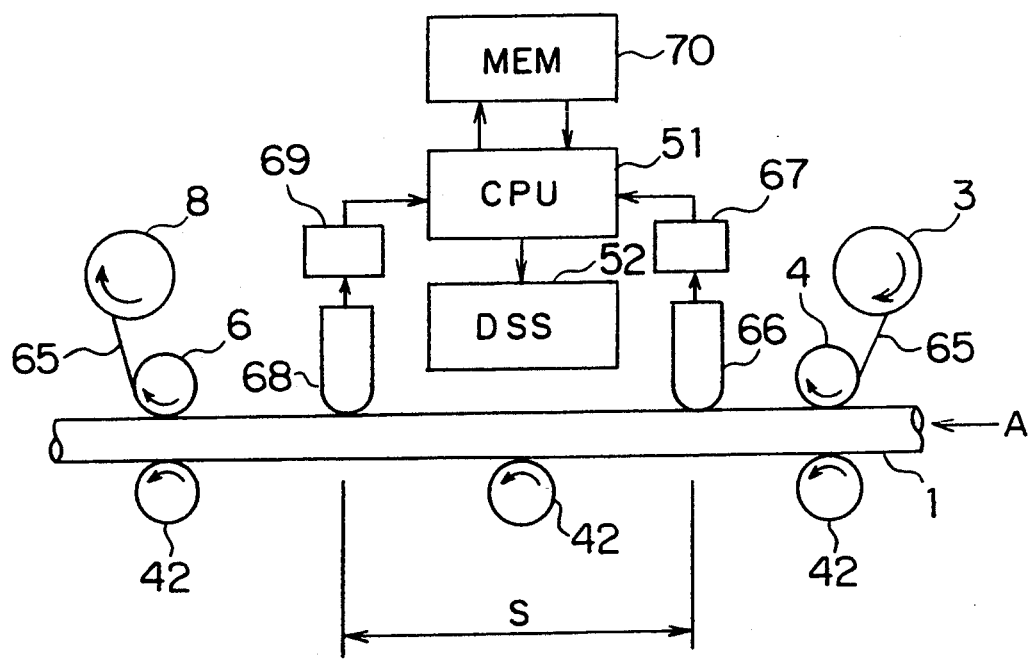
FIG. 12 is a view showing the construction of a length measuring apparatus as an eighth embodiment of the present invention.

FIG. 12 shows the constitution of the length measuring apparatus of the present embodiment.

The length measuring apparatus has, in addition to a magnetic tape 65 having magnetic marks provided in advance at the mark intervals MS and with an adhesive coated on its reverse, a tape feed drum 3 which adheres the magnetic tape 65 to the surface of the cable 1 and conveys it along with the cable 1 and then peels the magnetic tape 65 from the cable 1, a tape adhering roller 4, a tape peeling roller 6, and a tape windup drum 8. The length measuring apparatus further has a first reproduction head 66 for detecting marks provided on the running magnetic tape 65, a second reproduction head 68 which is disposed away from the reproduction head 66 by exactly a predetermined standard length measurement distance S, and a first and second reproduction circuits 67 and 69, which process the signals from the reproduction heads, issue the reproduction signals, and output the same to the length measuring apparatus body 51. Further, the length measuring apparatus has a memory means connected to the length measuring apparatus body 51. In the above embodiment, the memory means 70 was explained as a memory inside the length measuring apparatus body 51 and was not illustrated, but in this embodiment the memory means 70 is illustrated and explained.

Figure 13:
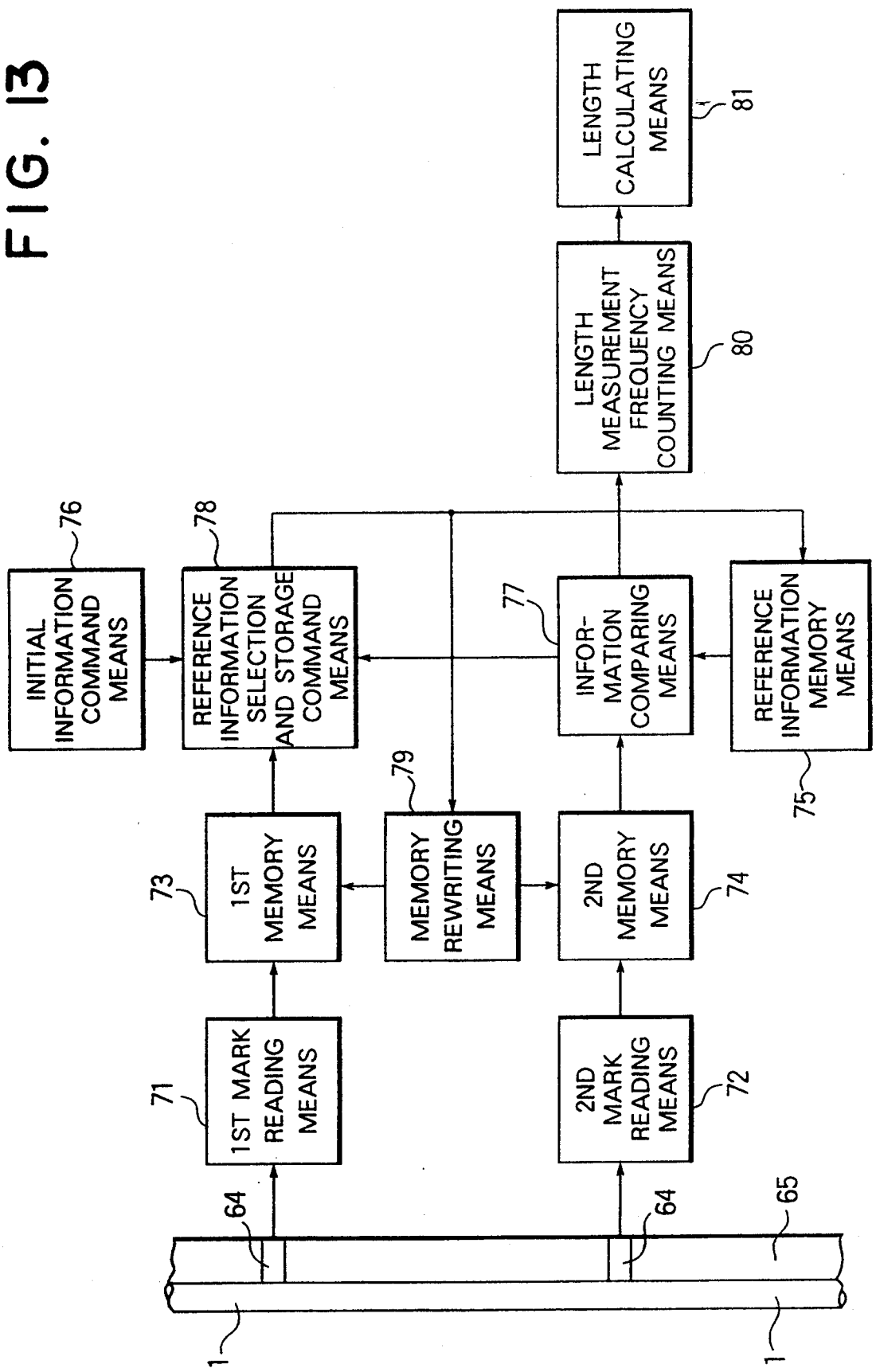
FIG. 13 is a view illustrating the length measuring apparatus shown in FIG. 12 broken down into functional blocks.

FIG. 13 shows the construction of the length measuring apparatus shown in FIG. 12 by functional blocks. The length measuring apparatus of this functional block construction has a first reproduction head 66, a first reproduction circuit 67, a central processing unit (CPU) and a first mark reading means 71 comprised of a control program operating by this CPU built in the length measuring apparatus body 51, a second reproduction head 68, a second reproduction circuit 69, and a second mark reading means 72 which is comprised of the CPU of the length measuring apparatus body 51 and the control program thereof. Further, the length measuring apparatus has a first memory means 73, a second memory means 74, and a basic or reference information memory means 75 forming part of the memory means 70. Further, the length measuring apparatus has a memory rewriting means 79, an information comparison means 77, an initial information command means 76, a basic or reference information selection and memory command means 78, and a length calculating means 81 comprised of the CPU of the length measuring apparatus body 51 and its control program. Further, the length measuring apparatus has a length measurement number or frequency counting means 80 comprised of the CPU of the length measuring apparatus body 51 and its control program and part of the memory of the memory means 70.

The magnetic tape 65 adhered to the surface of the cable 1 is given magnetic marks 64, such as bar codes, by random patterns in as short an interval as possible, for example, intervals of 50 μm.

The first mark reading means 71 and the second mark reading means 72 read the above-mentioned marks 64 of the magnetic tape 65. The marks 64 read by the mark reading means 71 and 72 are stored in the first and second memory means 73 and 74 by the memory rewriting means 79.

The initial information command means 76 is, out of the data stored in the first memory means 73, the first read data serving as the reference for the length measurement which measures the length based on the standard length measurement distance S. The reference position data, representing the position of the cable 1, is stored in the basic or reference information memory means 75. The information comparison means 77 compares the data stored in the second memory means 74 and the data stored in the reference memory means 75 and when they match judges that the cable 1 has moved by exactly the standard length measurement distance S1 and outputs a length measurement signal (count signal) to the length measurement frequency counting means 80. The memory rewriting means 79 rewrites the data stored in the first and second mark reading means 71 and 72 in response to the length measurement signal. The length measuring frequency counting means 80 increments the count N by 1 each time a length measurement signal is input. The length calculating means 81 calculates the length of the cable 1 based on the results of the length measurement frequency counting means 80.

Figure 14:
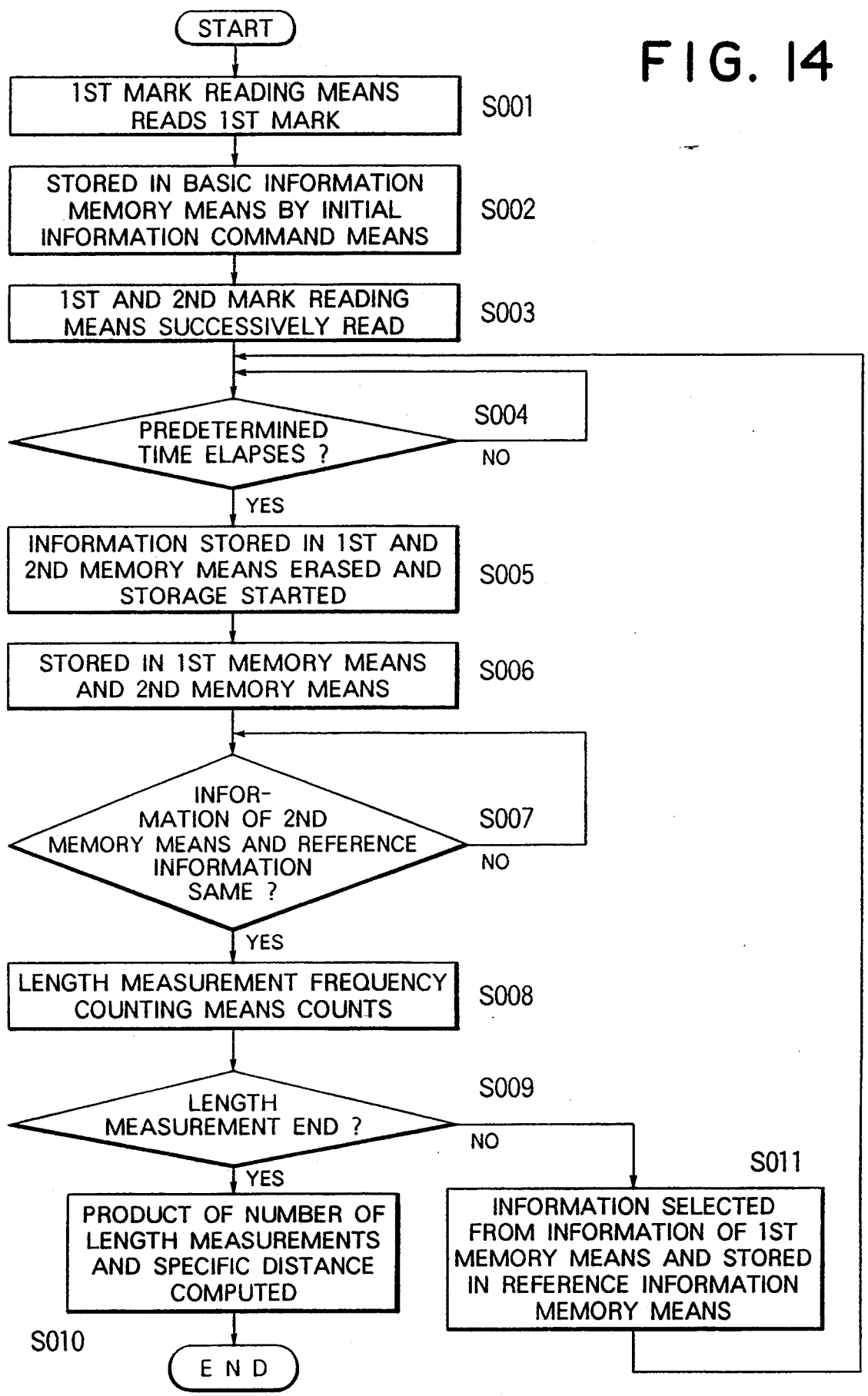
FIG. 14 is a flow chart for explaining the operation of the length measuring apparatus shown in FIG. 13.

A flow chart showing the operation of the length measuring apparatus is shown in FIG. 14.

Steps S001 to S003

The first mark reading means 71 reads the initial mark (step S001). The read data is stored by the initial information command means 76 in the basic or reference information memory means 75 (step S002). The first and second mark reading means 71 and 72 successively read the marks (step S003).

The operation of the steps S004 to step S006 will be explained later.

Step S007 to S009 and S011

The information comparing means 77 compares the stored content of the second memory means 74 and the basic or reference information memory means 75 (step S007) and if matching outputs a length measurement signal to the length measurement frequency counting means 80. The length measurement frequency counting means 80 increments the count N by exactly 1 if a length measurement signal is input (step S008).

A judgement is made as to if the automatic length measurement is ended or not (step S009). If not yet ended, the reference information selection and storage command means 78 selects from the data stored in the first memory means 73 and stores the reference information in the reference information memory means 75 (step S011) and then returns to the operation of step S004.

Step S010

When the automatic length measurement has ended, the length calculating means 81 refers to the count N of the length measurement frequency counting means 80 and calculates the length of the moving cable 1.

Note that in the above operation, in the same way as in the past, the length measuring apparatus body 51 shown in FIG. 12 displays the results of the intermediate length measurement on an LCD or other display device 52, measurement is made of the length of the front end and the final end of the cable 1 manually, and the results of the measurement are input to the length measuring apparatus body 51 through a not shown input apparatus 53.

As explained above, even in this length measuring apparatus, the number of length measurements of standard length measurement distances is counted and the length of the cable 1 is calculated, but since the first mark reading means 71 and the second mark reading means 72 are operated simultaneously to read the marks, no length measurement error occurs and the precision of measurement of each length is high.

Figure 15:
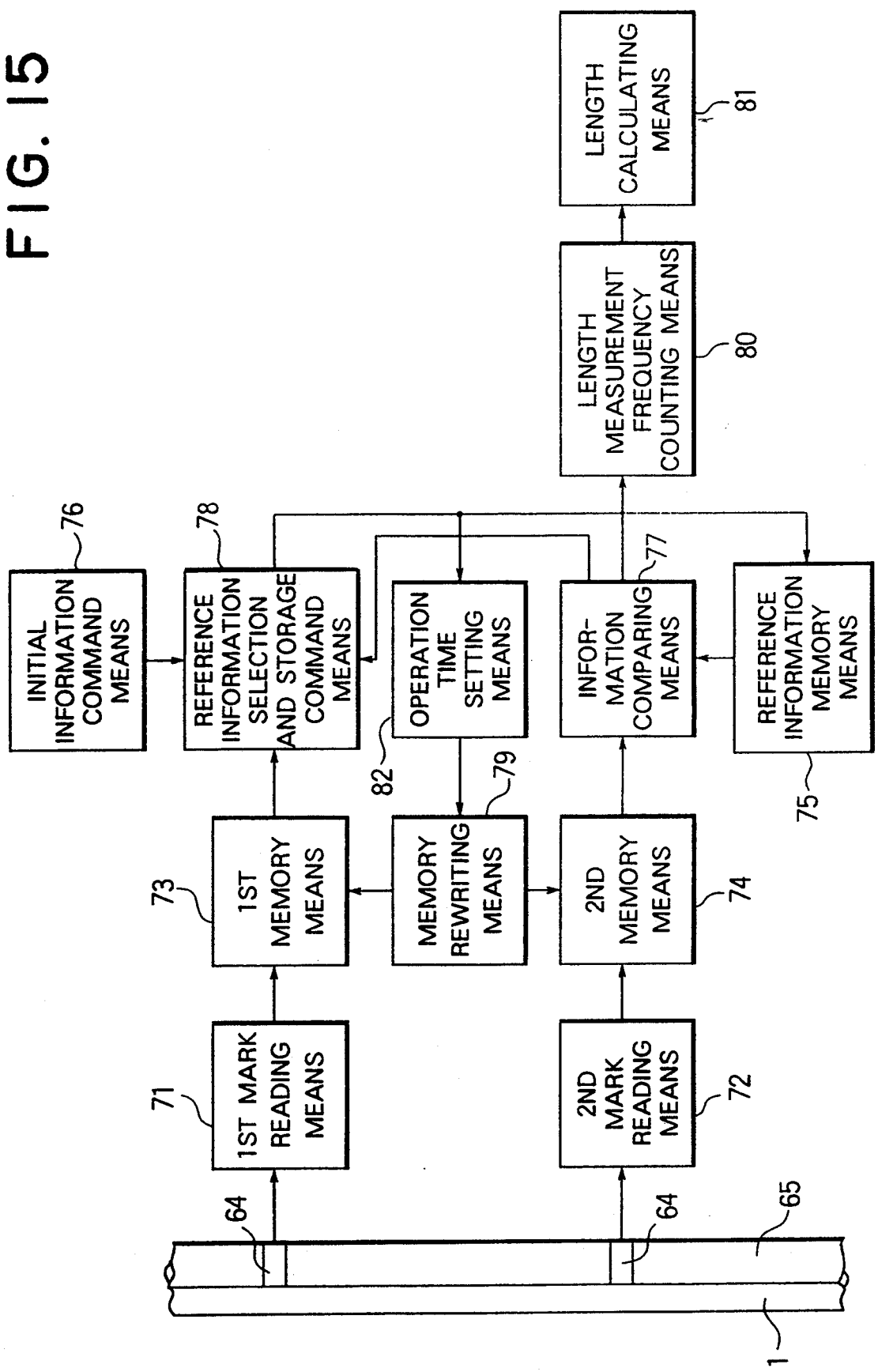
FIG. 15 is a view illustrating the length measuring apparatus shown in FIG. 12 as different function blocks from FIG. 13.

FIG. 15 shows the construction of a length measuring apparatus of a modification of the length measuring apparatus shown in FIG. 12. The length measuring apparatus is provided with an operation time setting means 82 between the reference information selection and storage command means 78 and the memory rewriting means 79. This operation time setting means 82 is provided for the processing shown in steps S004 to S006 of FIG. 14.

When a predetermined time elapses (step S004), the memory rewriting means 79 erases the stored content of the first and second memory means 73 and 74 and starts storing (step S005). The memory means 73 and 74 store the marks from the first and second mark reading means 71 and 72 (step S006). In this way, in this embodiment, by replacing the stored content after a time, the storage of marks unrelated to the length measurement is reduced and the capacity of the first memory means 73 and the second memory means 74 can be cut.

In the above examples, in FIG. 13 and FIG. 15, the first mark reading means 71 and the second mark reading means 72 were explained in terms of the case of reading magnetic marks recorded on a magnetic tape 65, but it is also possible to read optical marks.

Further, the first mark reading means 71 and the second mark reading means 72 are not limited to the above-mentioned mark reading means and can be made means for detecting and reading parameters showing the characteristics of the cable itself to be measured in length, such as the roughness of the surface of the cable 1, the variation in height, within a range of several microns, etc. as cable characteristic parameter signals. In this case, since the characteristics of the moving cable 1 itself are detected, there is no need to provide marks on the surface of the cable 1 and there is no need to provide a tape conveyed along with the cable 1. That is, the first and second cable characteristic signal reading means used as the first mark reading means 71 and the second mark reading means 72 directly detect the surface roughness, state of conveyance, and other parameters of the cable 1 to be measured in length and the detection results are used to measure the length of the cable 1 in accordance with the method explained with reference to FIG. 14 by the construction shown in FIG. 13 and FIG. 15.

Figure 16:
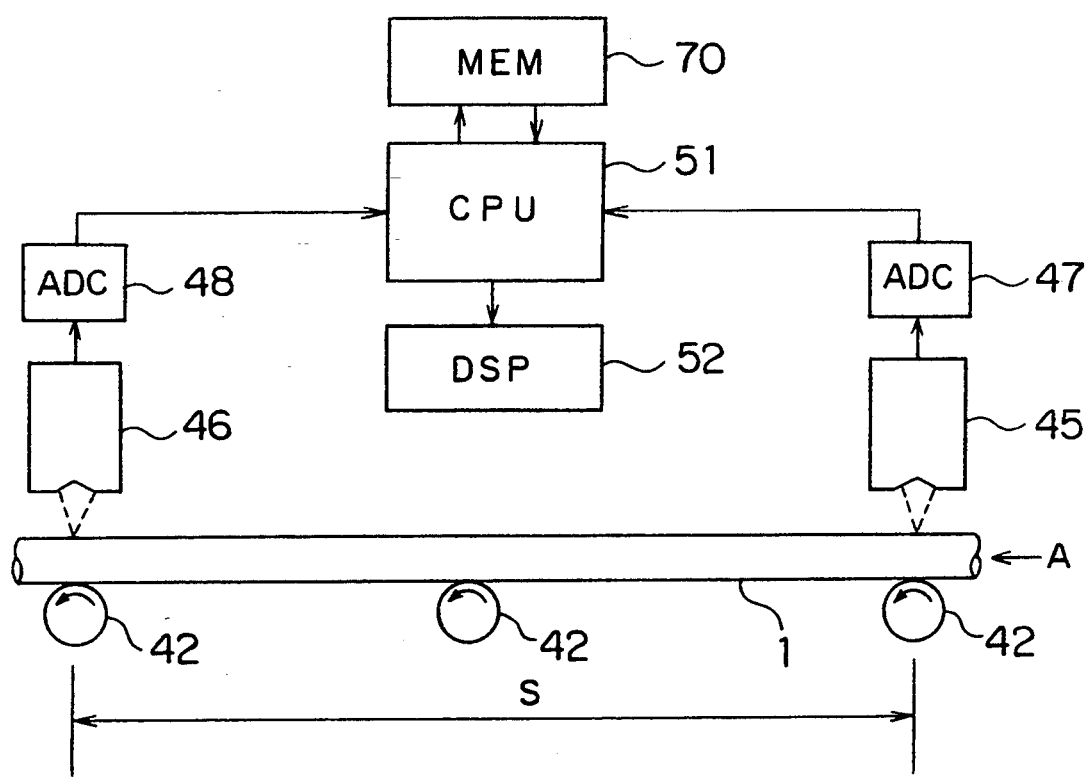
FIG. 16 is a view showing the construction of a length measuring apparatus of the marking system as a ninth embodiment of the present invention.

The length measuring apparatus of a ninth embodiment of the present invention is shown in FIG. 16. As the first and second mark reading means 71 and 72 in FIG. 13 and FIG. 15, use is made of the first reproduction head 66 and first reproduction circuit 57 and the second reproduction head 68 and the second reproduction circuit 59 to read the marks of the magnetic tape 65 in the example shown, but in FIG. 16, as the first mark reading means 71, use is made of the first sensor 45 and the first ADC 47 shown in FIG. 6 and as the second mark reading means 72, use is made of the second sensor 46 and the second ADC 48. The length measuring apparatus shown in FIG. 16 detects the optically detectable marks made on the surface of the cable 1, but the length measurement operation is the same as in the above-mentioned eighth embodiment and so the explanation thereof will be omitted.

The length measuring apparatus of a 10th embodiment of the present invention will be explained with reference to FIG. 17 to FIG. 21.

In the embodiment explained above, optically detectable marks provided on the surface of a running cable 1 sometimes cannot be accurately detected when the cable 1 is twisted and therefore accurate length measurement cannot be performed. The 10th embodiment solves this problem.

Figure 17:
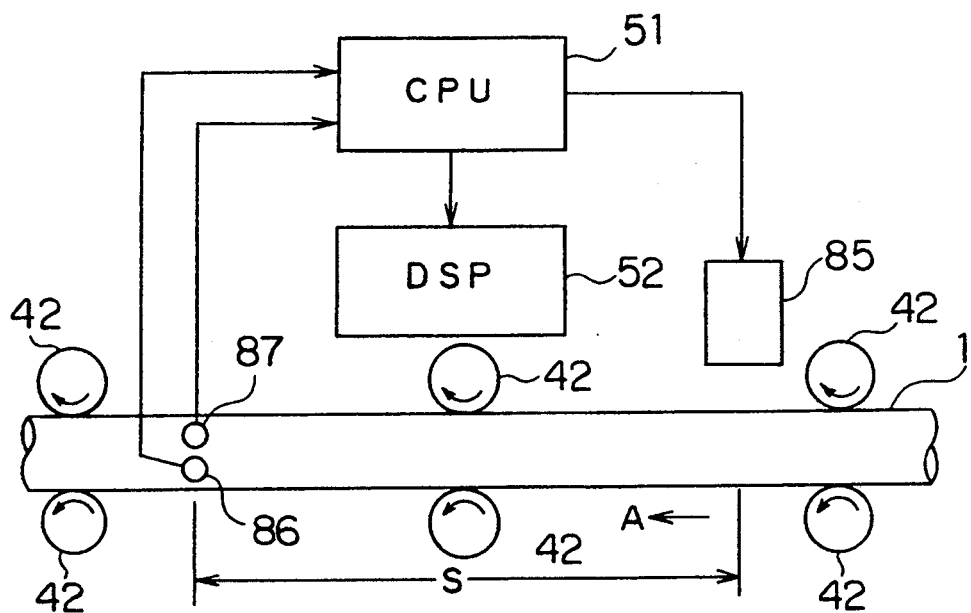
FIG. 17 is a view showing the construction of a length measuring apparatus of the marking system as a 10th embodiment of the present invention.

FIG. 17 is a constitutional view of the length measuring apparatus of the present invention.

The length measuring apparatus, in addition to the length measuring apparatus body 51 and the display device 52, has a marking means 85 which makes optical marks on the surface of the cable 1 and first and second optical mark reading means 86 and 87 such as laser switches. Behind these first and second mark reading means 86 and 87 there is an ADC corresponding to the ADC 48 of FIG. 4, but it is omitted from this figure. The center position of the second mark reading means 87 and the center position of the first mark reading means 86 are equivalent at the position intersecting the direction of movement of the cable 1. The interval between the marking position of the marking means 85 and the reading detection position of the first mark reading means 86 or the reading detection position of the second mark reading means 87 is equivalent to the standard length measurement distance S.

Figure 18:
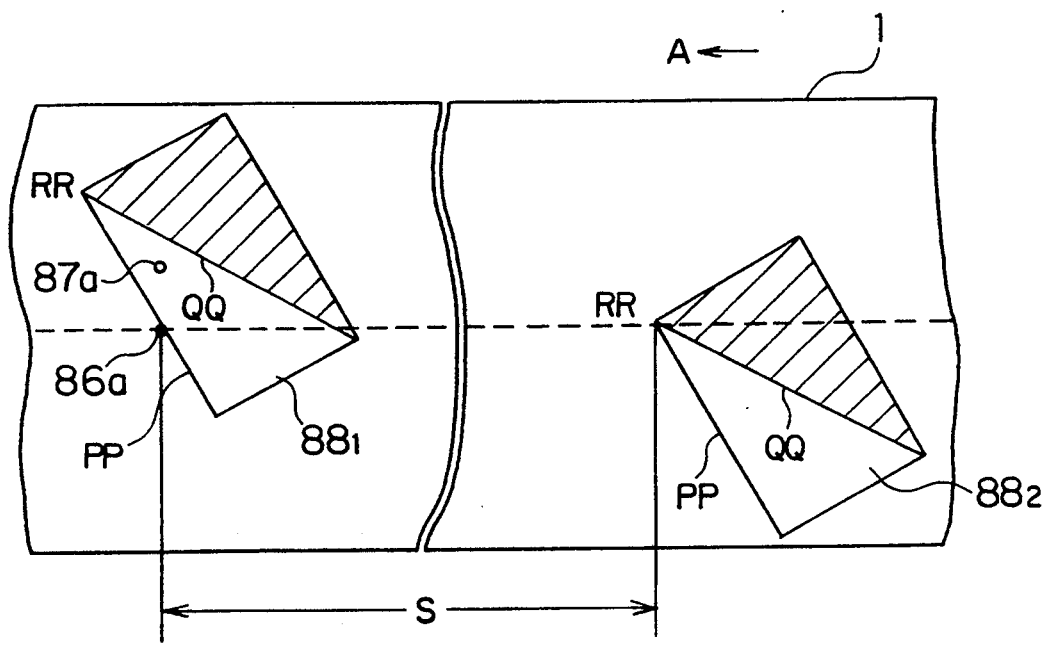
FIG. 18 and FIG. 19 are views for explaining the operation of the length measuring apparatus shown in FIG. 17.

FIG. 18 is an enlarged view of the mark 88 applied to the surface of the cable 1 and shows the positional relationship between the detection point 86a of the first mark reading means 86 and the detection point 87a of the second mark reading means 87. The detection point 86a of the first mark reading means 86 and the detection point 87a of the second mark reading means 87 are at the same position in the direction intersecting the direction of running of the cable 1.

The mark 88 given by the marking means 85 is block shaped overall and is defined by the long line PP extending from the point RR of the block and the diagonal line QQ. The portion under the diagonal line QQ is colored a color, for example, white, enabling clear discrimination from the surface of the cable 1, which is, for example, black, while the portion above the diagonal line QQ is colored a color near the surface of the cable 1, for example, black, to enable clear discrimination of the top and bottom of the diagonal line and to enable clear discrimination of the diagonal line QQ.

Further, FIG. 18 shows the case where the left side mark $88_1$ and the right side mark $88_2$ spanning the standard length measurement distance S are deviated from the centerline of the cable 1 due to twisting of the cable 1.

Figure 19:
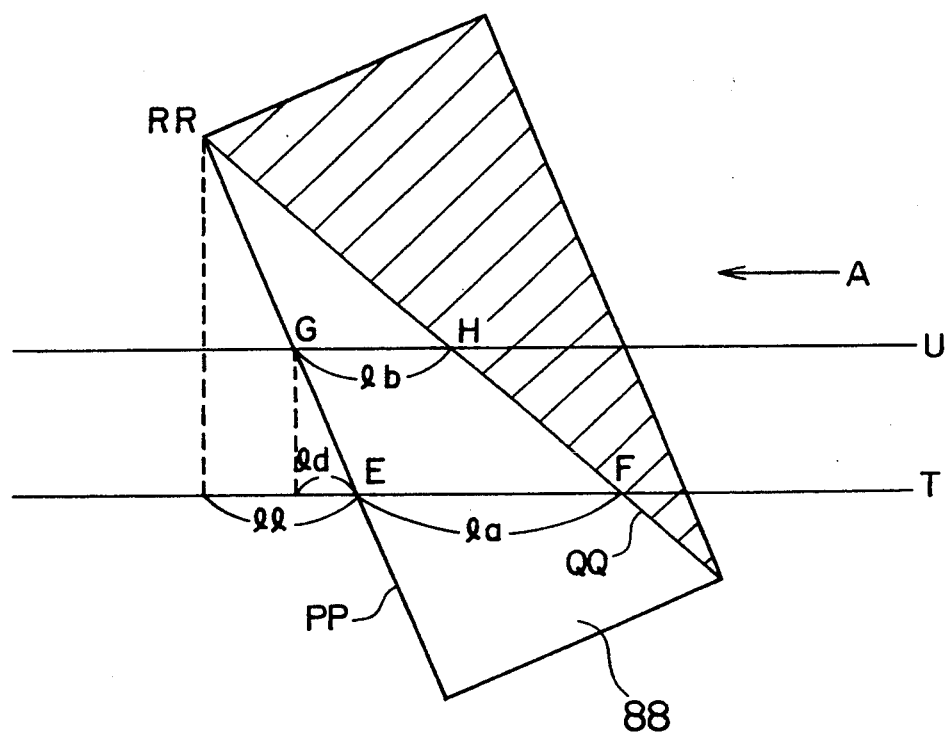

FIG. 19 is an explanatory view enlarging the mark $88_1$ shown in FIG. 18 and for the detection of the twisting.

Figure 20:
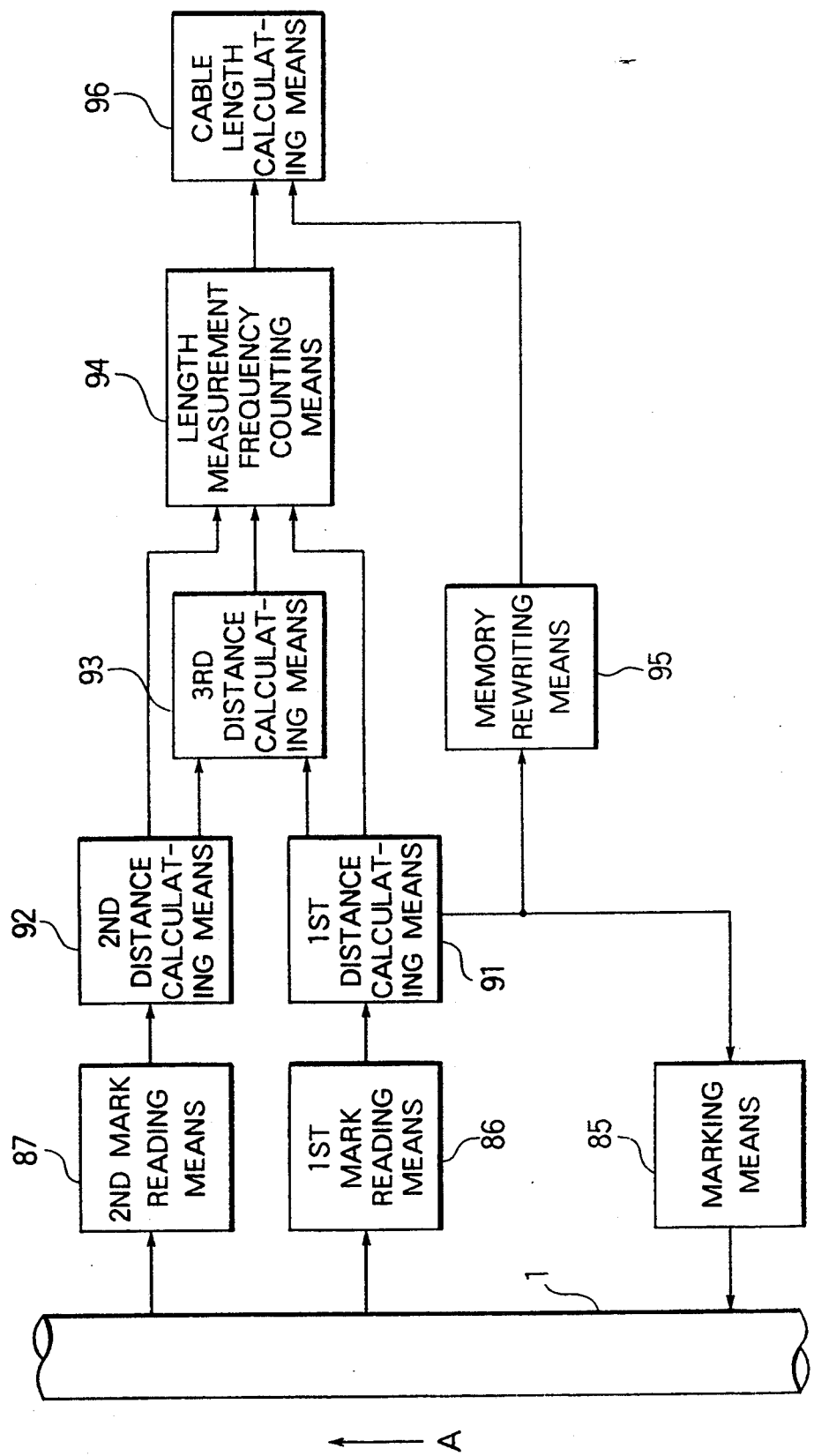
FIG. 20 is a view showing the length measuring apparatus of the 10th embodiment of the present invention by functional blocks.

FIG. 20 shows the functions of the length measuring apparatus of FIG. 17 as a block construction. The length measuring apparatus is comprised, by a CPU and control program constituting the length measuring apparatus body 51 of FIG. 17, of a first distance calculating means 91, a second distance calculating means 92, a third distance calculating means 93, a length measurement distance or frequency calculating means 94, a length measurement frequency counting means 95, and a cable length calculating means 96. The marking means 85, the first mark reading means 86, and the second mark reading means 87 are the same as those explained above.

The first distance calculating means 91 calculates the first distance la shown in FIG. 19 based on signals from the first mark reading means 86. The second distance calculating means 92 calculates the second distance lb shown in FIG. 19 based on signals from the second mark reading means 87. The third distance calculating means 93 calculates the third distance ld. The length measurement distance or frequency calculating means 94 calculates the length measurement distance LS based on the following equation:

$$LS = S + [(la \cdot ld)/(la - lb)] \tag{19}$$

The length measurement frequency counting means 95 increments the length measurement count N each time the first mark reading means 86 reads the mark 88. The cable length calculating means 96 calculates the length of the cable 1 based on the results of calculation from the length measurement frequency counting or memory rewriting means 95 and the length measurement distance or frequency calculating means 94.

Figure 21:
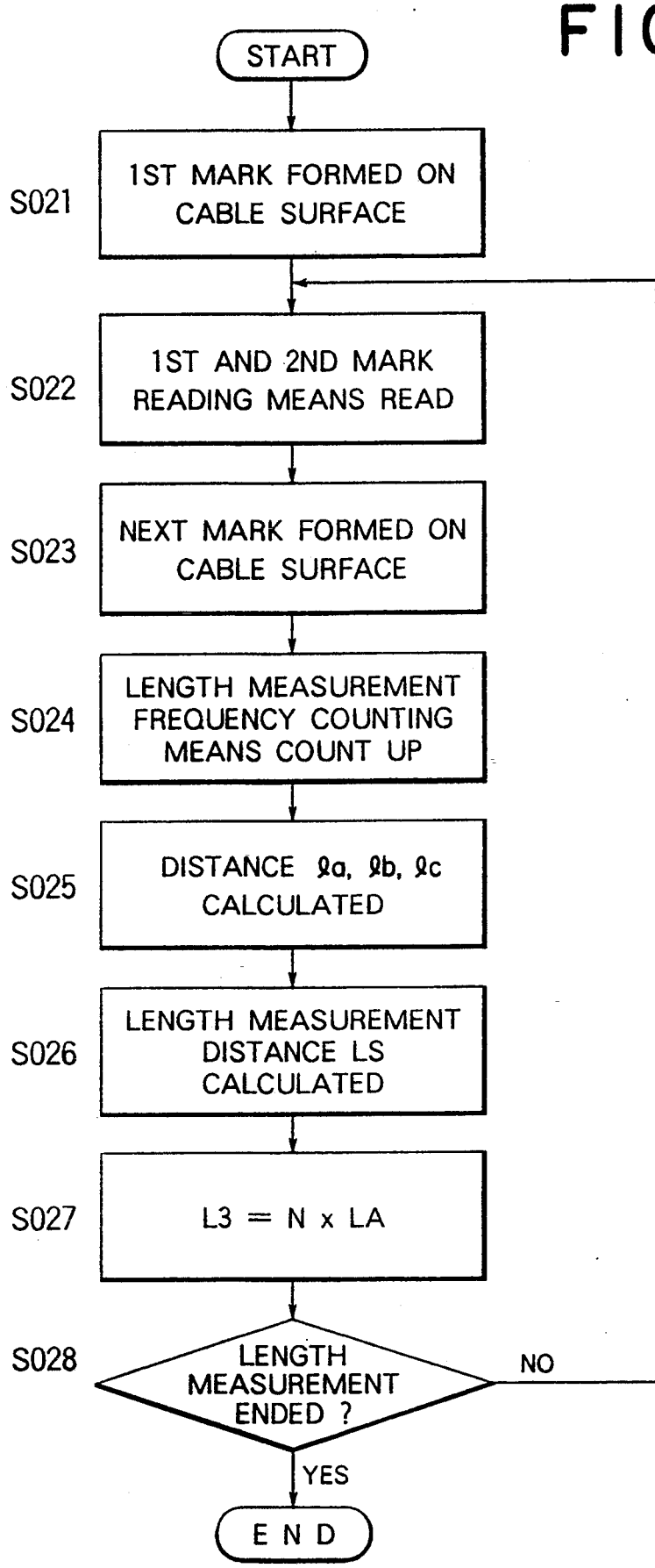
FIG. 21 is a flow chart of the operation of the length measuring apparatus shown in FIG. 20.

FIG. 21 shows an operational flow chart of the length measuring apparatus shown in FIG. 20.

Step S021

The marking means 85 forms the first mark 88 on the surface of the cable 1 by the start of the automatic length measurement operation. Note that at the time of the initial operation, the length measurement frequency counting means 95 clears the count N to "0".

Step S022 to S024

The first distance calculating means 91 and the second distance calculating means 92 read the points E, F, G, and H at the mark 88 shown in FIG. 19 and store the read time (step S022). When the second mark reading means 87 reads the point E of the mark 88, it immediately issues a command to the marking means 85 and forms the following mark 88 from the marking means 85 (step S023). At the same time, the second mark reading means 87 starts up the length measurement frequency counting or memory rewriting means 95 as well and increments the length measurement count N (step S024).

Step S025 to 027

The first to third distance calculating means 91 to 93 calculate the above-mentioned first to third distances 1a, 1b, and 1d from the time when the first and second mark reading means 86 and 87 read the points E, F, G, and H of the mark 88 (step S025). The length measurement distance or frequency calculating means 94 uses the calculated distances 1a, 1b, and 1d and the standard length measurement distance S to calculate the length measurement distance LS based on the above equation (33) (step S026). The cable length calculating means 96 calculates the measured length $L4 = N \times LS$ of the cable 1 by multiplying the length measurement distance LS calculated by the length measurement distance or frequency calculating means 94 and the count N calculated by the length measurement frequency counting means 95 (step S028).

Step S028

The processing of steps S022 to step S027 is repeated until the automatic length measurement is ended.

According to this embodiment, even if the mark 88 is deviated in position due to twisting of the cable 1, accurate measurement of the length of the cable 1 becomes possible.

An 11th embodiment will now be explained with reference to FIG. 22 and FIG. 23.

Figure 22:
FIG. 22 is a view illustrating the measurement conditions covered by the length measuring apparatus of the 11th embodiment of the present invention shown in FIG. 23.

In the above-mentioned embodiment using an encoder, if there is undulation in the surface of the cable 1 as shown in FIG. 22, the rotation of the encoder wheel mimics the undulation, so error occurs in the length measurement. Further, a change in ambient temperature or a change in the diameter of the encoder wheel due to wear etc. cause error in the length measurement. The 11th embodiment solves this problem.

Figure 23:
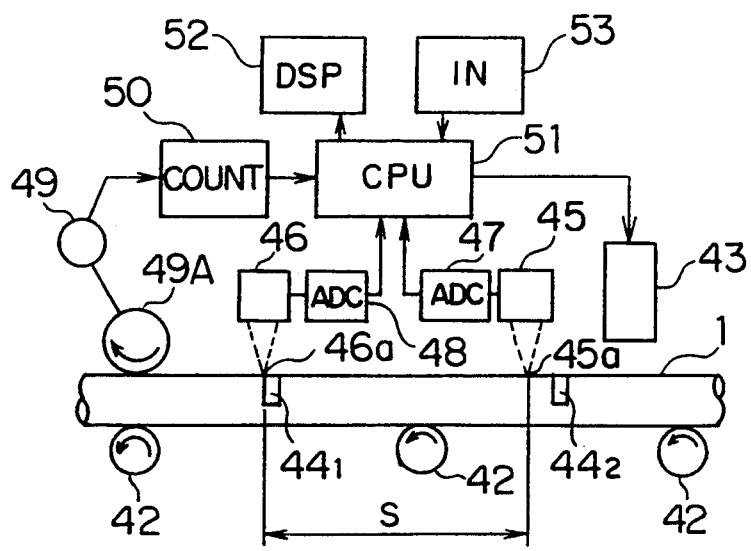
FIG. 23 is a view showing the construction of a length measuring apparatus of an 11th embodiment of the present invention.

FIG. 23 shows the construction of a length measuring apparatus of this embodiment. The length measuring apparatus has a marker 43 which makes optically detectable marks on the surface of the cable 1, optical first and second sensors 45 and 46 such as laser switches, first and second ADC's 47 and 48, an encoder wheel 49A, an encoder 49, a counter 50, a display device 52 such as an LCD, and a keyboard or other input apparatus 53. The marker 43 makes optically detectable marks 44 on the surface of a cable 1 moving on conveyance rollers 42. The length L5 of the cable 1 measured by the encoder 49 is calculated as the product of the distance of movement $\Delta L$ per pulse of the encoder 49 and the count N of the counter 50.

$$L4 + \Delta L \cdot N \quad (20)$$

Here, $\Delta L$ is defined by the following equation:

$$\Delta L = \pi D / J \quad (21)$$

where, D is the diameter of the encoder wheel 49A and J is the number of pulses output from the encoder 49 with each rotation of the encoder wheel 49A.

By inserting equation 21 into equation 20, the following equation is obtained:

$$L4 = \pi N D / J \quad (22)$$

The diameter D of the encoder wheel 49A is measured manually and input along with the above-mentioned count J through an input apparatus 53 into the length measuring apparatus body 51.

If the actual diameter of the encoder wheel 49A at the time of measurement is Dt, the following equation stands:

$$Dt = k \cdot D \quad (23)$$

where, k is a correction coefficient.

The correct measured length Lt when the diameter of the encoder wheel 49A is Dt is expressed by the following equation:

$$Lt = \pi N Dt / J \quad (24)$$

If this equation 24 is inserted into equation 23, the following equation is obtained:

$$Lt = k \cdot L4 \quad (25)$$

Therefore, in the embodiment, by measuring the correction coefficient k on line, the length can be accurately measured.

Below, an explanation will be given of the method of calculation of the correction coefficient k on line. The length measuring apparatus body 51 makes marks on the surface of the cable 1 at a certain period through the marker 43. This period is suitably set in accordance with changes in the diameter of the encoder wheel 49A. For example, when the diameter of the encoder wheel 49A due to wear etc. changes extremely slowly, the period is one month or six months. When there is an extremely great temperature change even during one day etc., the marking may be performed at periods of several hours. Further, it may be performed at any timing desired.

When the mark $44_1$ given in this way is detected by the first sensor 45, the length measuring apparatus body 51 stores the count SC1 of the counter 50 at that time. Next, when the mark $44_1$ is detected by the second sensor 46, the length measuring apparatus body 51 stores the count SC2 of the counter 50 at that time. In this way, the distance detected by the encoder 49 when the mark $44_1$ runs a standard length measurement distance S is $(SC2-SC1)\Delta L$. If the standard length measurement distance S is accurately measured in advance, the standard length measurement distance S is not dependent on the encoder wheel 49A and it is possible to find the correction coefficient k by the following equation:

$$k = S / (SC2 - SC1) \Delta L \quad (26)$$

Therefore, the length measuring apparatus body 51 measures the accurate length Lt using the correction coefficient k.

Note that what the encoder wheel 49A measures, as shown in FIG. 22, is the actual length including even any undulation which exists.

Figure 24:
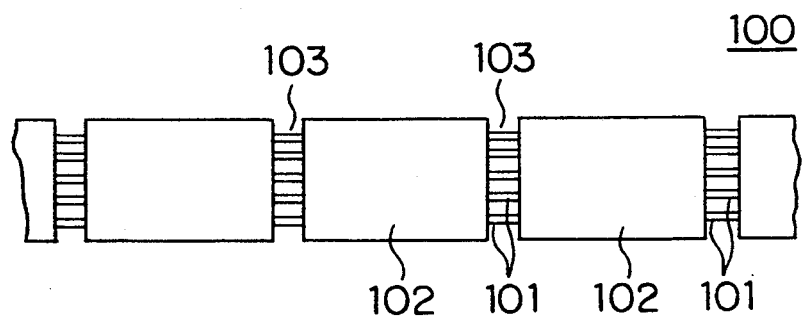
FIG. 24 and FIG. 25 are views showing a modification of the length measuring apparatus shown in FIG. 23.
Figure 25:
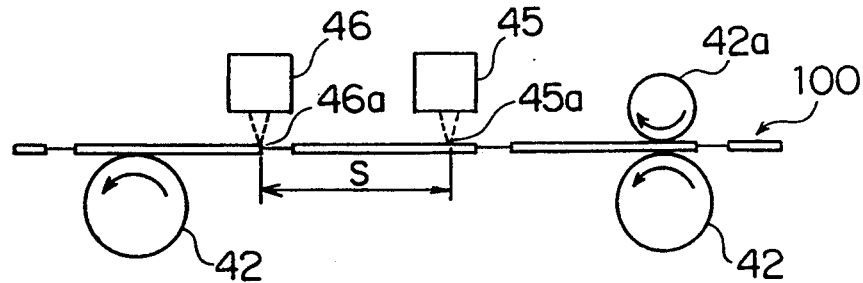

Another example of the application of the length measuring apparatus of the 11th embodiment shown in FIG. 23 will be explained with reference to FIG. 24 and FIG. 25. This example uses the length measuring apparatus shown in FIG. 23 and has a plurality of cores 101 laid in parallel as shown in FIG. 24 partially and periodically covered by tape-like sheaths 102, between the sheaths 102 windows 103 being provided. An explanation will be made of the case of measurement of the length of a flat cable 100. The measurement system is shown in summary in FIG. 25. The flat cable 100 is conveyed by the conveyance rollers 42 and 42a.

The first sensor 45 and the second sensor 46 measure the ends of the tape-like sheaths 102 which are separated by the windows 103 instead of the optically detectable marks 44 shown in FIG. 23. The lengths of the tape-like sheaths 102 in the direction of movement are known, so it is possible to refer to the lengths, calculate the above-mentioned correction coefficient k, and measure the length of the cable 1 accurately.

A 12th embodiment of the present invention will be explained below with reference to FIG. 26 and FIG. 27.

The construction of the length measuring apparatus shown in FIG. 26 is the same as the construction of the length measuring apparatus shown in FIG. 23.

This embodiment reduces the error in the length measurement due to variations in the marking on the surface of the moving cable 1 due to a delayed response in the measurement of the length of the cable 1 moving at a high speed and to variations in the marking operation, as the marking operation of the marker 43 making optically detectable marks, for example, marks by an ink jet, usually takes several tens to several hundreds of milliseconds.

The first sensor 45 and the second sensor 46, for example, laser switches, are arranged with the detection point 45a of the first sensor 45 and the detection point 46a of the second sensor 46 separated by exactly the standard length measurement distance S. The marking position of the marker 43 and the detection point 45a of the first sensor 45 are disposed separated by exactly a mark interval of a distance D shorter than the standard length measurement distance S. Here, the distance C between the standard length measurement distance S and the mark interval D is shown by the following equation:

$$C = S - D \tag{27}$$

Figure 27:
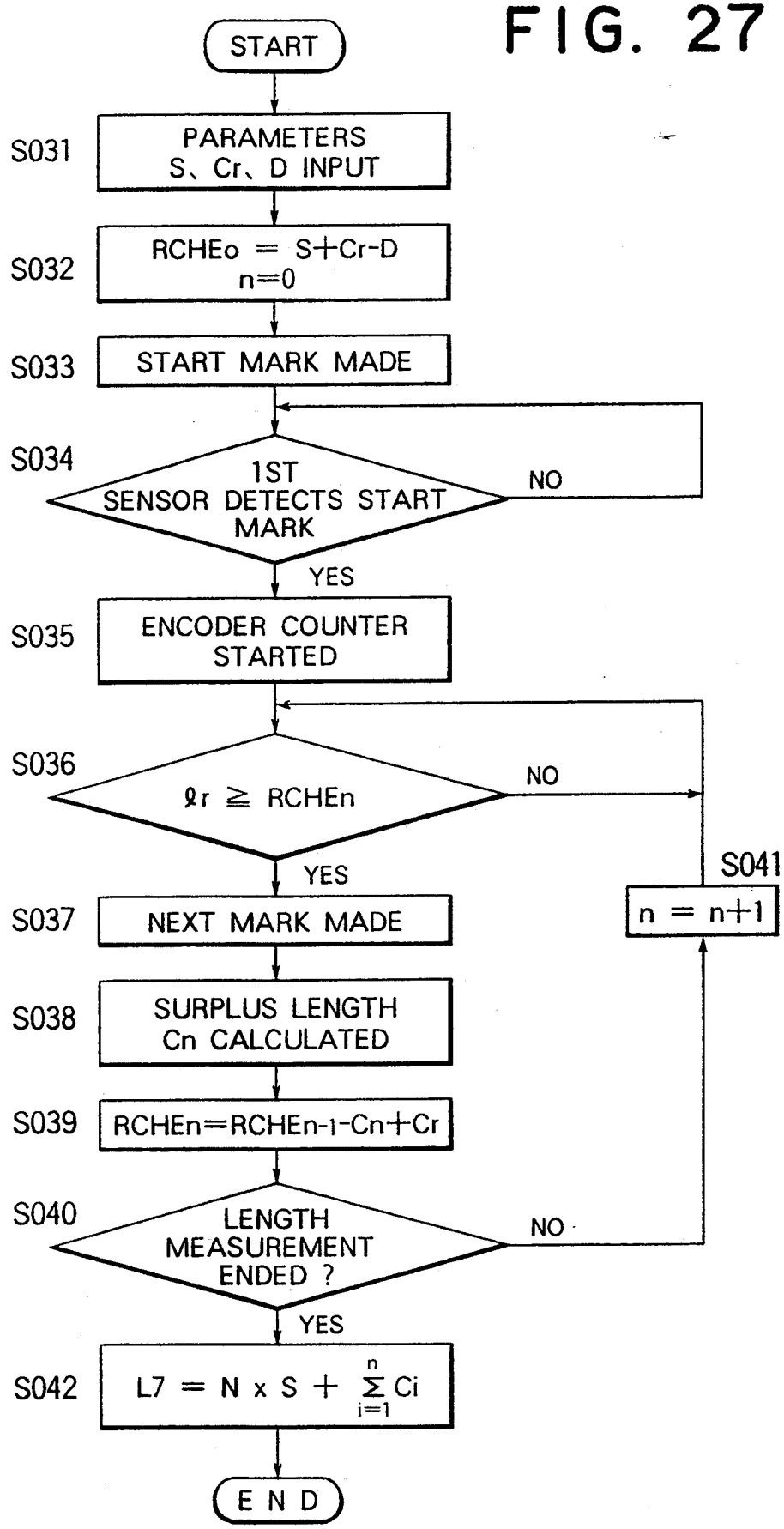
FIG. 27 is a flow chart for explaining the operation of the length measuring apparatus of FIG. 26.

FIG. 27 is a flow chart of the operation of the length measuring apparatus, mostly the length measuring apparatus body 51. The operation of the length measuring apparatus will be explained below with reference to the flow chart.

Step S031 to S033

The target surplus length Cr, the standard length measurement distance S, and the mark distance D are set in the length measuring apparatus body 51 through the input apparatus 53 (step S031). The length measuring apparatus body 51 calculates the check reference length $RCHE_0$ (step S032).

$$RCHE_0 = S + Cr - D \tag{28}$$

Further, the length measuring apparatus body 51 initializes the loop operation index n to "0" (step S032). The length measuring apparatus body 51 outputs the marking command to the marker 43 and makes the first mark $44_0$ on the surface of the running cable through the marker 43 (step S033).

Step S034 to S035

The length measuring apparatus body 51 stands by until the first sensor 45 detects the first mark $44_0$ (step S034). When the first sensor 45 detects the first mark $44_0$, the length measuring apparatus body 51 starts the count of the counter 50 (step S035).

Step S036

From the time when the first sensor 45 detects the first mark $44_0$, the length measuring apparatus body 51 monitors the count of the counter 50 and judges if the running length lr of the cable 1 shown by the count of the counter 50 has reached the check length RCHEn.

Step S036 to S039

When the running length lr reaches the check length RCHEn (step S036), the length measuring apparatus body 51 makes the next mark $44_1$ on the surface of the cable 1 by the marker 43 (step S037). When the first mark $44_0$ is detected by the second sensor 46, the length measuring apparatus body 51 calculates the distance Cn (in this case, $C_1$) (step S038).

$$C_1 = L6(SC1 - SC2) \tag{29}$$

where, SC1 is the count of the counter 50 when the first sensor 45 detects the mark $44_1$, SC2 is the count of the counter 50 when the second sensor 46 detects the mark $44_0$, and L6 is the distance of movement of the cable 1

If the distance $C_1$ is sought, the length measuring apparatus body 51 corrects the check length RCHE (step S039).

$$RCHE_1 = RCHE_0 - C_1 + Cr \tag{30}$$

Step S040 to S041

The length measuring apparatus body 51 judges if the measurement of length is ended (step S040) and if the length measurement is not ended, the index n is incremented by 1 (step S041) and the above-mentioned processing is repeated.

Step S040 to S042

When the automatic length measurement is ended (step S040), the length measuring apparatus body 51 calculates the sum of the above-mentioned distance Ci and calculates the total length L7 of the cable 1 (step S042).

In this way, it is possible to calculate the distance C accurately and, using this distance C, to measure the length of the cable 1 accurately.

Note that in this embodiment, the explanation was made of the case of use of the encoder 49 as a sensor for measuring the continuous cable distance of movement, but in the same way as explained previously, use may also be made of a laser type movement distance measurement sensor using the Doppler effect or a laser type distance measurement sensor using a spectral pattern.

A 13th embodiment of the present invention will be explained with reference to FIG. 28 and FIG. 29a to 29g.

In a length measuring apparatus using the marking system, for example, the length measuring apparatus shown in FIG. 4, to maintain the precision of measurement per unit, the interval between the marker 43 and the first sensor 45 is made about the same length as the standard length measurement distance S. Usually, the standard length measurement distance S is made 1 to 3 meters. If the interval between the marker 43 and the first sensor 45 is also made 1 to 3 meters the same extent as the standard length measurement distance S, there is the problem that the distance required for length measurement becomes longer and the apparatus becomes larger. Further, between the marker 43 and the encoder wheel 49A, it is necessary to move the cable 1 in a straight line state with no slumping, bending, etc. This embodiment solves this problem.

The length measuring apparatus shown in FIG. 28 has, as shown in the above-mentioned embodiment, the marker 43, the image camera 61 using a CCD and image camera signal processing circuit 62 as the first sensor, the second sensor 46 and second ADC 48, the length measuring apparatus body 51, the display device 52, and the input apparatus 53.

The length measuring apparatus further has a third mark detection sensor 105, a sensor movement mechanism 110 for moving the sensor 105, a driver 106 for driving the sensor movement mechanism 110, and an ADC 107 for converting the analog output signals from the third mark detection sensor 105 to digital signals. The sensor movement mechanism 110 is comprised of a frame 111, a threaded shaft 112 rotatably supported on the frame 111, a motor 113 for rotating the threaded shaft, and an automatic stage 114 screw-engaged with the threaded shaft 112 for moving the third mark detection sensor 105. The sensor movement mechanism 110 is driven by the driver 106 by a command from the length measuring apparatus body 51.

The operation of the length measuring apparatus will be explained with reference to FIGS. 29a to 29g.

As shown in FIG. 29a, before the automatic length measurement, a mark $44_o$ is made on the surface of the cable 1 at a suitable position a3 from the front end 1A of the cable 1 by the marker 43 by a command from the length measuring apparatus body 51. As this marking, there is, as mentioned above, the ink jet system, stamp system, and labeling system. The distance a3 from the front end 1A of the cable 1 to the marking position 43a is measured by a tape measure etc. and input to the length measuring apparatus body 51 through the input apparatus 53.

The length measuring apparatus body 51 issues a command for conveying the cable 1 to the cable conveyance mechanism. By this, the cable 1 is conveyed in the direction of the arrow 1.

As shown in FIG. 29b, when the mark $44_o$ reaches the detection position 105a of the third mark detection sensor 105, the mark 440 is detected by the third mark detection sensor 105, and the detection signal is input through the ADC 107 to the length measuring apparatus body 51. When this detection signal is input, the length measuring apparatus body 51 outputs a marking command to the marker 43 and the next mark $44_1$ is made on the surface of the cable 1.

When the cable 1 moves to the position shown in FIG. 29c, the mark $44_o$ is detected by the second sensor 46 at the detection point 46a of the second sensor 46 and the detection signal is input through the second ADC 48 to the length measuring apparatus body 51. The length measuring apparatus body 51 displays the above-mentioned distance a3 on the display device 52, and the image camera 61 is made to measure the length through the image camera signal processing circuit 62. The image camera 61 measures the detection position 61a of the image camera and the mark $44_1$. The distance $C_1$, as mentioned above, shows the difference of the mark interval MS from the standard length measurement distance S, that is, the surplus length. The method of measurement of the surplus length is the same as the method explained with reference to the 12th embodiment.

When the surplus length $C_1$ measured is a positive value, the length measuring apparatus body 51 moves the third mark detection sensor 105, through the driver 106 and sensor movement mechanism 110, to the right side in the figure, that is, the image camera 61 side, by exactly the measured surplus length $C_1$. When the surplus length $C_1$ is negative, the length measuring apparatus body 51 moves the third mark detection sensor 105 to the second sensor 46 side by exactly the distance $C_1$. That is, when the speed of movement of the cable 1 increases, the third mark detection sensor 105 is moved to the right side and the distance D shortened. When the speed of movement of the cable 1 decreases, the third mark detection sensor 105 is moved in the reverse direction. This enables the surplus length $C_1$ to be suppressed to a small range even if the speed of movement of the cable 1 changes.

Figure 29D:
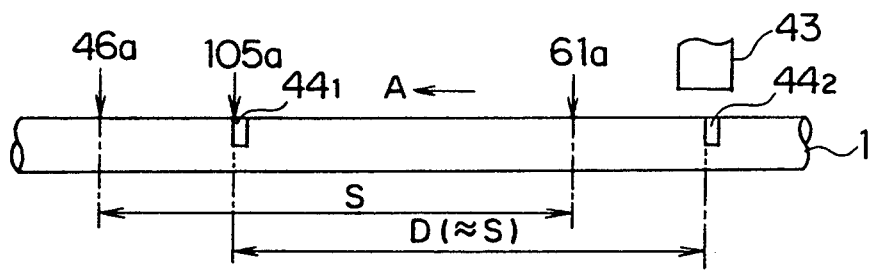

As shown in FIG. 29d, if the mark $44_1$ is detected by the third mark detection sensor 105, the length measuring apparatus body 51 outputs a marking command to the marker 43 and a mark $44_2$ is made on the surface of the cable 1.

Figure 29E:
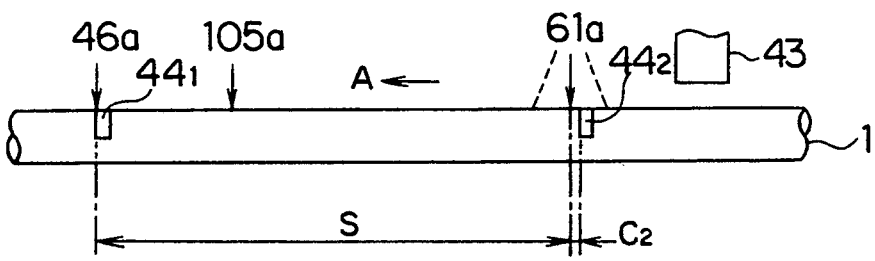

As shown in FIG. 29e, when the mark $44_1$ reaches the detection point 46a of the second sensor 46, the second sensor 46 detects that mark. The length measuring apparatus body 51 changes the length measurement count. Further, the length measuring apparatus body 51 measures the surplus length with respect to the mark $44_2$ through the image camera 61 and stores it in the memory.

In this way, the first measurement of the standard length measurement distance S is made. The above-mentioned length measurement operation is then repeated.

Figure 29F:
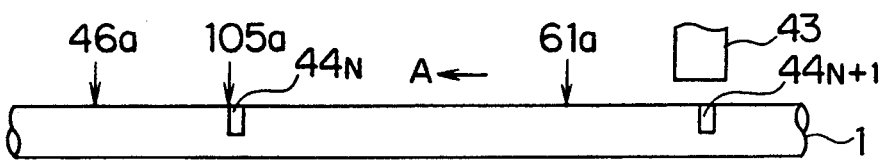

As shown in FIG. 29f, when the N-th mark $44_N$ is detected by the third mark detection sensor 10, the length measuring apparatus body 51 makes the mark $44_{N+1}$ on the surface of the cable 1 by the marker 43.

Figure 29G:
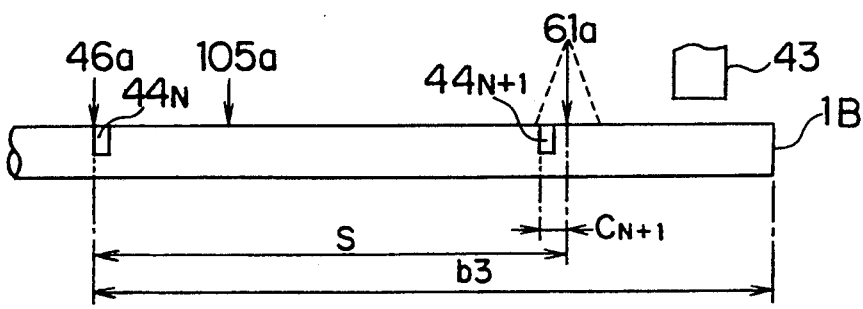

As shown in FIG. 29g, when the mark $44_{N+1}$ is detected by the second sensor 46, the automatic length measurement is ended.

A worker measures the distance b3 between the mark $44_{N+1}$ and the rear end 1B of the cable 1 by a tape measure etc. and inputs it into the length measuring apparatus body 51 through an input apparatus 53. The length measuring apparatus body 51 calculates the measured length L7 of the cable 1.

$$L7 = a3 + \Sigma C_i + N \cdot S + b3 \tag{31}$$

As explained above, according to this embodiment, the third mark detection sensor 105 is arranged between the image camera 61 used as the first sensor and the second sensor 46, and at the point of time when the third mark detection sensor 105 detects the mark, marking is performed by the marker 43, so it is possible to make the measurement distance of the cable 1 shorter. If the measurement distance is short, not only does the overall construction of the length measuring apparatus become smaller, but also the maintenance of the straightness of the cable 1 in the measured distance becomes easy, so the precision of measurement is improved. Further, the position of the third mark detection sensor 105 is adjusted according to the size of the surplus length C, so length measurement of a high precision free from the effects of changes in the speed of movement of the cable 1 becomes possible.

Figure 30A:
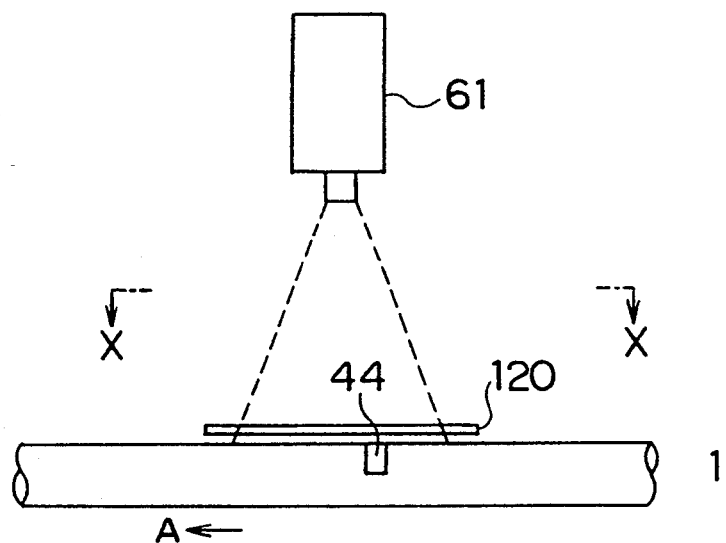
FIGS. 30a and 30b are views showing the partial constructions of a length measuring apparatus as a 14th embodiment of the present invention.
Figure 30B:
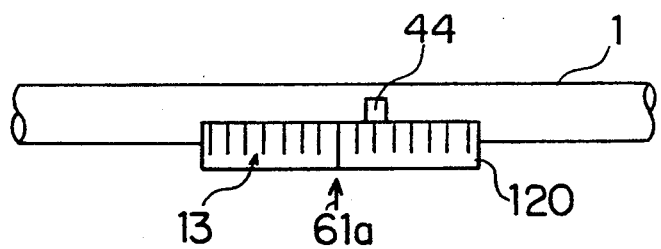

The length measuring apparatus of a 14th embodiment of the present invention will be explained below with reference to FIGS. 30a and 30b and FIG. 31.

For example, in the length measuring apparatus shown in FIG. 28, there was the following problem. Since the cable 1 is moving, the distance between the front end of the third mark detection sensor 105 and the surface of the cable 1 fluctuates within a certain range and the precision of detection falls. To eliminate the effects of this fluctuation in distance, the distance between the cable 1 and the third mark detection sensor 105 must be made larger and the depth of focus of the third mark detection sensor 105 must be made greater, but if the third mark detection sensor 105 vibrates, the error in the mark detection becomes extremely large and specific determination of the detection position 105a of the third mark detection sensor 105 becomes difficult, so deviation of position becomes difficult to discover.

This embodiment solves this problem. As shown in FIG. 30a, provision is made of a reference scale 120 near the moving cable 1. This reference scale is provided with graduations 121 at equal intervals. FIG. 31 is an enlarged view of the graduations 121. At the center of the graduations at the position matching the detection position 61a of the image camera is a center graduation $120_o$. Before and after it provision is made of the graduations $121_1$ and $121_2$ at intervals t, for example, 2 mm.

Figure 31:
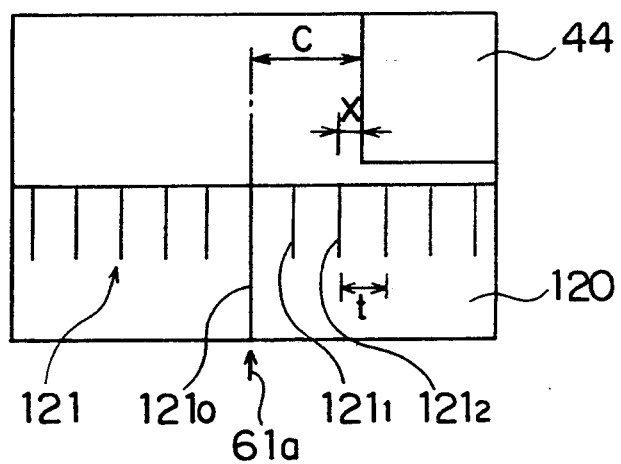
FIG. 31 is an enlarged view of FIG. 30b.

When the image camera 61 detects the mark 44 and measures the surplus length C, the image camera 61 receives as input the image data shown in FIG. 31. The length measuring apparatus body 51 measures the difference of distance of the mark 44 from the graduation $121_o$ roughly by the graduation $121_2$, then calculates the distance x between the graduation $121_2$ and the edge of the mark 44 from the number of pixels corresponding to the graduation interval t. For example, when the graduation interval t is 2 mm and the number of pixels in it is 100, if the number of pixels from the graduation $121_2$ to the mark 44 is 50, the distance x can be calculated as 1 mm. The length measuring apparatus body 51 uses this distance x for measurement of the length.

In this way, according to this embodiment, the standard length measurement distance S between the image camera 61 and the second sensor 46 may be accurately defined and the surplus length C may be accurately measured, so the precision of length measurement is extremely improved. Further, according to this embodiment, since the graduation $121_o$ is provided, it becomes easy to position the detection position 61a of the image camera.

The length measuring apparatus of a 15th embodiment of the present invention will be explained below with reference to FIG. 32. This embodiment duplicates the marking measurement system and the encoder measurement system in the length measuring apparatus shown in FIG. 4 so as to improve the reliability.

This length measuring apparatus has a length measuring apparatus body 51, display device 52, input apparatus 53, and marker 43. The length measuring apparatus has two encoder measurement systems shown in FIG. 3, that is, the first encoder 32 and first counter 36 and the second encoder 34 and second counter 37. Further, the length measuring apparatus has four mark detection units, that is, the first sensor 141 and its ADC 142, the second sensor 143 and its ADC 144, the third sensor 145 and its ADC 146, and the fourth sensor 147 and its ADC 148.

The first sensor 141 and the second sensor 143 are mounted on the same frame (not shown) and the distance between them is S1. The third sensor 145 and the fourth sensor 147 are also mounted on the same frame and the distance between them is S3. The distance between the second sensor 143 and the third sensor 145 is made S2. For example, the distance S1 and S3 is much shorter than the distance S2, for example, is 32.5 mm, while the distance S2 is 2.95 m, about the same as the above-mentioned standard length measurement distance S. The distance S1 and the distance S3 should be very short, but due to the relationship of the dimensions of the adjoining sensors 141 with 143 and 145 with 147 is made the above value in this embodiment. In this way, the measurement system using the marking system is duplicated, but the overall length is not made much longer.

The encoder wheel 33 and the encoder wheel 35 may be arranged closely adjoining as illustrated and may also be arranged, for example, with the encoder wheel 35 behind the fourth sensor 147 so as to reduce the effects of slipping as explained with reference to FIG. 3.

This embodiment performs a count adjustment operation on the counter to deal with slipping, as explained with reference to FIG. 3, so as to enable the encoder system itself to accurately measure the length.

Further, this embodiment may perform an operation as a duplicated system of the fourth embodiment explained with reference to FIG. 4. This operation will be explained below.

The length measuring apparatus body 51 performs, as the marking measurement system, the measurement of the length using a combination of the sensors based on the following table. In the table, blanks indicate that the sensors are normal, while x's indicate that the sensors have broken down. The numbers in the table show the reference numerals of the sensors.

TABLE 1

| 141 | 143 | 145 | 147 | Main measurement system | Secondary measurement system |
|---|---|---|---|---|---|
|   |   |   |   | 141–145 | 143–147 |
| x |   |   |   | 143–145 | 143–147 |
|   | x |   |   | 141–145 | 141–147 |
|   |   | x |   | 141–147 | 143–147 |
|   |   |   | x | 141–145 | 143–145 |

When the sensors are all normal, the length measuring apparatus body 51 uses the combination of the first sensor 141 and the third sensor 145 as the main marking measurement system and uses this measurement system to measure a main measurement distance (S1+S2) and further uses the combination of the sensor 143 and the fourth sensor 147 as a secondary marking measurement system and uses this measurement system to measure a secondary measurement distance (S2+S3).

Further, the encoder measurement system of the first encoder 32 and the first counter 36 is used as the main encoder measurement system and the second encoder 34 and the second counter 37 are used as the secondary encoder measurement system.

The length measuring apparatus body 51 uses the main marking measurement system and the main encoder measurement system to measure the length of the cable 1. This operation is the same as the fourth embodiment explained with reference to FIG. 4. However, in this embodiment, there is a secondary marking measurement system and a secondary encoder measurement system. These secondary marking measurement system and secondary encoder measurement system are used for judging the normality of the measurement of the main marking measurement system and the main encoder measurement system.

The length measuring apparatus body 51 compares the results of the length measurement of the main encoder measurement system with the results of the length measurement of the secondary encoder measurement system. When it judges that the difference is above a tolerance value, the results of the main encoder measurement system differ greatly from the normal results of measurement, and the main encoder measurement system is abnormal, uses the results of the secondary measurement system.

Alternatively, as in the case of the third embodiment explained with reference to FIG. 3, the length measuring apparatus body 51 adjusts for slippage of the encoder wheel 35 or the encoder wheel 33 in the same way as the length measuring apparatus body 38 and uses the larger count of the counts of the first counter 36 and the second counter 37. However, if either of the counts greatly deviates from the scheduled value or the count will not proceed, it considers the encoder measurement system to have broken down and uses the results of the normally operating encoder measurement system.

The results of two systems are compared for the marking measurement system as well. When the error of the two results exceed a tolerance value and one of the values deviates from the scheduled value, the combination of sensors is changed to specifically determine the broken sensor. Once the broken sensor is specifically determined, the sensor combination is changed in accordance with Table 1.

As explained above, according to this embodiment, first of all, measurement of the length never becomes impossible due to breakdown of one of the encoder measurement systems or one of the marking measurement systems. If trouble occurs in some sort of measurement system during measurement of the length of a moving cable 1, the length can no longer be measured, but according to this embodiment, the probability of measurement becoming impossible is remarkably reduced. Further, according to this embodiment, the marking measurement system and the encoder measurement system are each duplicated so there is the effect that it is possible to specifically determine the broken down sensor or encoder.

Figure 32:
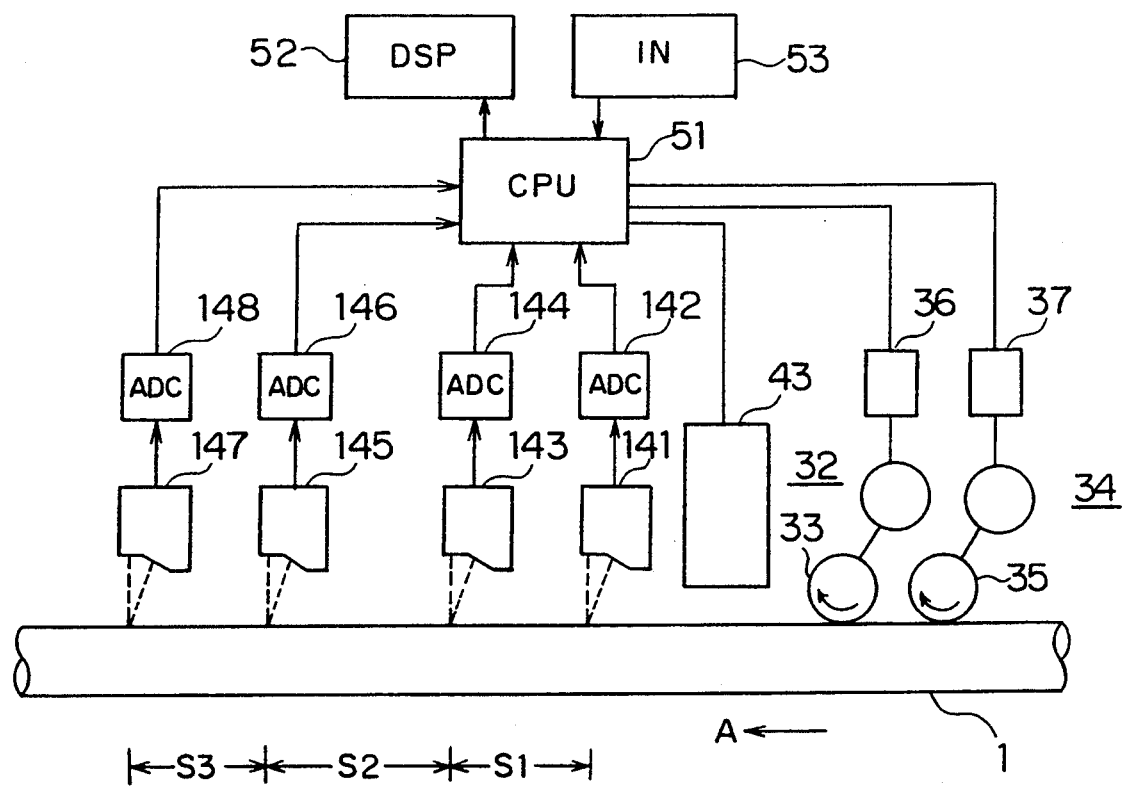
FIG. 32 is a view showing the construction of a length measuring apparatus as a 15th embodiment of the present invention.

In FIG. 32, the marker 43 may also be duplicated. For example, when the sensors do not detect some mark or another for a predetermined period of time, the marker 43 can be judged to be broken and the length measuring apparatus body 51 can operate a duplicate system marker. Even during the period where no mark is detected the length is measured by the first encoder 32 or the second encoder 34, so measurement of the length of the cable 1 never becomes impossible.

A 16th embodiment of the present invention will be explained below with reference to FIG. 33 and FIG. 34. This embodiment relates to the accurate measurement of the standard length measurement distance S.

As explained above, the measurement of length of the present invention is based on measurement of unit lengths of distance, so it is necessary that the value of the standard length measurement distance S be accurately measured. The method of compensating for temperature etc. affecting the standard length measurement distance S was explained with reference to FIG. 2. However, before such temperature compensation, it is necessary to accurately measure the standard length measurement distance S.

For example, in the case of a precision of measurement of 0.02 percent, a precision of setting of the standard length measurement distance S of 0.01 percent or less is demanded. For example, if the standard length measurement distance S is 3 meters, the allowable error is less than 0.3 mm. If the length of the standard length measurement distance S is made greater, the allowable error may be made larger too, but the length of the length measuring apparatus along with direction of movement of the cable 1 also becomes longer and it becomes difficult to maintain the straightness of the moving cable 1 in the range of this long standard length measurement distance S. Therefore, the standard length measurement distance S cannot be made large. Rather, it is desirable that it be 1 meter or less. An explanation will be made of a method for accurately measuring the standard length measurement distance S in such a situation.

Figure 33:
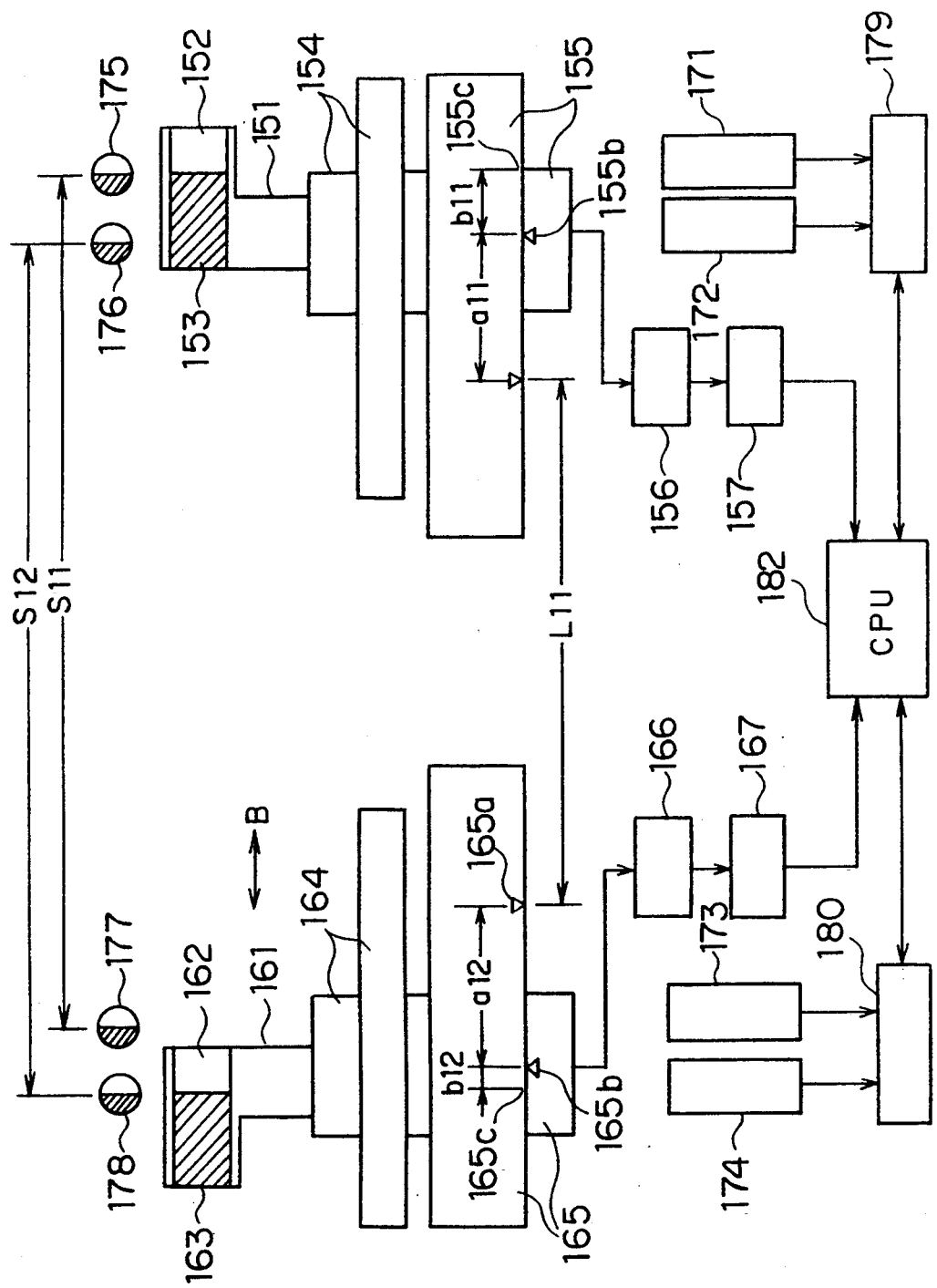
FIG. 33 is a view showing the construction of a standard length measurement distance measuring apparatus which measures the standard length measurement distance as a 16th embodiment of the present invention.
Figure 34:
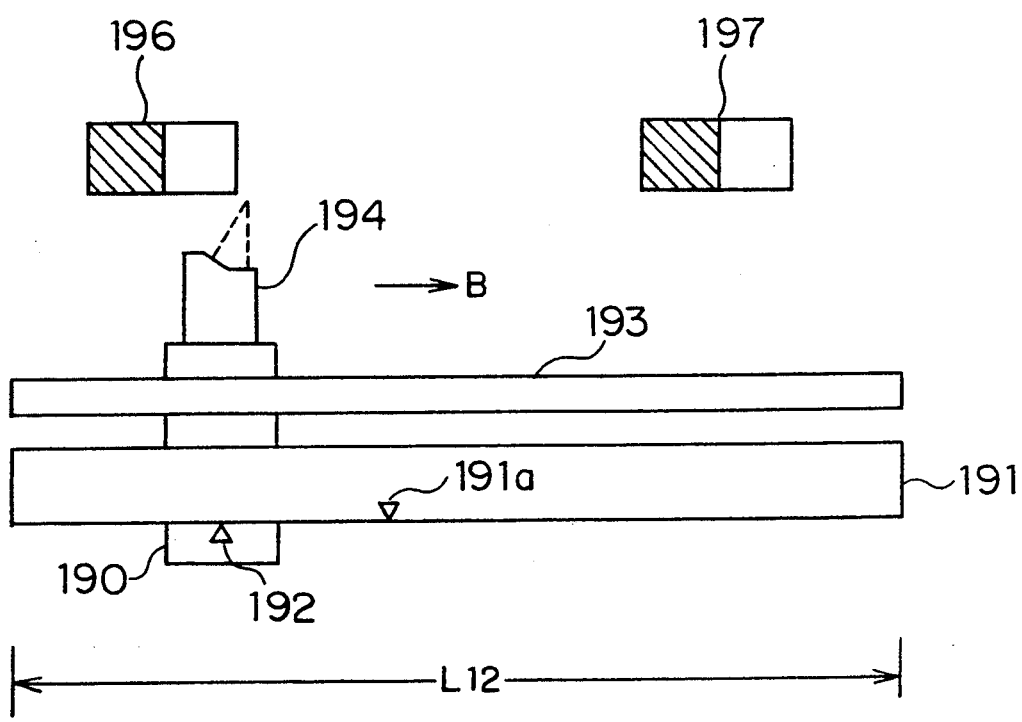
FIG. 34 is a view showing a modification of the standard length measurement distance measuring apparatus shown in FIG. 33.

The standard length measurement distance measurement apparatus of FIG. 33 has a first linear scale 155 and a second linear scale 165. The first linear scale 165 is provided with the first guide 154, at the tip of which is attached a first target 151. At the front end of the first target 151 are provided a first label 152 and first block rubber piece 153. The second linear scale 165, the second LM guide 164, the second target 161, the second label 162, and the second black rubber piece 163 are the same.

The first linear scale 155 moves in the direction of movement B. The first linear scale 155 and the first LM guide 154 are made to be movable accurately in parallel with the direction of movement of the cable 1 by mounting the first linear scale 155 and the first LM guide 154 on the body of the cable moving guide. The accurately reproduce the contrast of the cable surface and the mark, provision is made of the first target 151, on which target a first black rubber piece 153 of a thin rubber sheet is adhered. On top of this, a white first label 152 is adhered. The left edge of the first label 152 intersects the direction of movement of the cable 1, that is, the direction B, and is always in the same position. The relative position of the block of the first LM guide 154 and the slide head of the first linear scale 155 is fixed on the target frame. The target frame is positioned as illustrated when measuring the standard length measurement distance S, but during the normal length measuring operation of the cable 1, retracts from the position of movement of the cable 1. The above explanation was made of the first linear scale 155 side, but the same applies to the second linear scale 165 side.

FIG. 33 shows the construction of an apparatus using four mark sensors 171 to 174 as a double check apparatus. The laser beam spot positions 175 to 179 of the mark sensors 171 to 174 define the first standard distance S11 and the second standard distance S12. That is, the interval between the spot 175 of the first mark sensor and the spot 177 of the third mark sensor is the first standard distance S11 and the interval from the spot 176 of the second mark sensor and the spot 178 of the fourth mark sensor is the second standard distance S12. The "correction of the standard distance" spoken of in this embodiment means the accurate measurement of these standard distances S11 and S12.

Further, the first linear scale 155 and the second linear scale 165 are respectively provided with the first linear scale absolute origin 155a and the second linear scale absolute origin 165a, respectively, with the distance between them being the fixed L11.

The distance between the first linear scale absolute origin 155a and the slide head 155b is a11 and the distance between the slide head 155b and the position 155c of the left edge of the first label 152 is b11. Similarly, the distance between the second linear scale absolute origin 155a and the slide head 165b is a12 and the distance between the slide head 165b and the position 165c of the left edge of the second label 162 is b11.

The standard length measurement distance measurement apparatus shown in FIG. 33 has a computer 182 which computes and controls the measurement, a first linear scale adapter 156 and first encoder counter 157 for detecting the position of the first linear scale 155, and, similarly, a second linear scale adapter 166 and second encoder counter 167. The standard length measurement distance measurement apparatus has a first sensor switch adapter 179 and a second sensor switch adapter 180.

In this embodiment, the resolution of the first linear scale 155 and the second linear scale 165 is 5 μm and the maximum error of the measurement of the displacement is 20 μm. The first linear scale absolute origin 155a can be detected with a precision of 20 μm. The first linear scale absolute origin 155a is fixed at a position on the first linear scale 155. However, the position of the first linear scale absolute origin 155a and the position of the second linear scale absolute origin 165a differ.

The position of the first linear scale 155 can be measured by the computer 182 through the first linear scale adapter 156 and the first encoder counter 157. The relative precision with respect to the slide head is 20 μm. The same applies to the second linear scale 165.

Further, the positions of the slide head 155b and the slide head 165b can, in the same way as mentioned above, be detected using the computer 182. The positions of the position 155c of the left edge of the first label 152 and the position 165c of the left edge of the second label are fixed. Therefore, the above-mentioned distances a11, b11, a12, and b12 can be accurately detected.

Below, an explanation will be made of the basic operation for measuring the standard distances S11 and S12.

The first target 151 and the second target 161 are moved along the direction of movement B of the cable. The movement of the targets is stopped in the instant when the mark sensors 171 to 174 detect the label edges. The edges of the labels 152 and 162 at this time are superposed on the detection position of the spot of the mark sensors. This enables measurement of the first and second distances S12 and S12.

Next, an explanation will be given on how accurately the distance between the edges of the two labels 152 and 162 can be measured.

The distance M between the two labels is defined by the following equation:

$$M = L11 + a11 + a12 + b11 + b12 \quad (32)$$

Here, as mentioned above, the distances a11 and a12 can be found accurately by the computer 182 with a precision of about 20 μm. The distance (L11+b11+b12) is a fixed value which does not fluctuate. Therefore, once the distance (L11+b11+b12) is found and stored in the memory of the computer 182, it is possible to measure the distance M between the two labels by measuring the distances a11 and a12 by the above method.

Below, an explanation will be made of the method for measuring the distance M between the two labels as initial processing so as to find and store the above fixed distance (L11+b11+b12).

The first method for measuring the distance M between two labels is, for example, a method using 3 m long, high precision metal scale and a magnifying glass having a magnification power of 20. Using the magnifying glass, a11 and a12 are suitably adjusted so that the labels of the two targets precisely match the lines of the graduations of the high precision metal scale and the distance M between the two labels is measured. According to this measurement method, it is possible to measure the distance M between the two labels at a precision of about 0.2 mm.

A second method for measuring the distance between two labels will be explained with reference to FIG. 34. A long linear scale 191 is attached to the body 190 of the cable movement guide. The length L12 of this linear scale 191 is, for example, made 3 meters. On the frame, the linear 191 slide head 192, the LM guide 193 block, and the mark sensor laser switch 194 are made integral.

As shown in FIG. 33, the linear scale 191 has connected to it the second linear ruler adapter 166 and second encoder counter 167 and the computer 182. The output pattern when the linear ruler 191 is moved is read by the computer 182. The precision of reading is, as mentioned above, 20 μm. Further, the detection signal of the laser switch 194 is input to the computer 182.

In this construction, the distance M between the two labels is measured in the following way.

The absolute origin 191a of the linear scale 191 is detected through the computer 182, and the second encoder counter 167 is reset. The laser switch 194 is manually made to scan from the left to right of the linear scale 191. In the instant when the laser switch 194 detects the edge of the white label of the left target 196, the computer 182 reads the output N11 of the linear scale 191 and stores it in the memory. After this, the laser switch 194 is moved to the right. In the instant when the laser switch 194 detects the edge of the white label of the right target 197, the output value J11 of the linear scale 191 is read and stored in the memory. From the above, the computer 182 calculates the distance M between the two labels by the following equation:

$$M = Pk(j11 - N11) \tag{33}$$

where, Pk is a pulse/length conversion coefficient.

Note that before the above-mentioned measurement operation, the sensitivity of the laser switch 194 is adjusted and the distance between the target label and the laser switch 194 is set to a suitable magnitude, for example, 36 mm.

When the distance M between the two labels is calculated by any of the above methods, the distances a11 and a12 are measured and the distance (L11+b11+b12) is calculated. If use is made of the standard distances S1 and S2 measured in this way, the standard length measurement distance S can be measured with a precision of 0.01 percent or so and the length of the cable 1 can be measured extremely accurately.

In working the present invention, the above-mentioned embodiments can be combined in various ways.

Further, while the explanation was made using a cable 1 as an illustration of an elongated object to be measured in length, the length measuring apparatus of the present invention is not limited to a cable, but can be widely applied to length measuring apparatuses for measuring accurately long objects like cables.

Further, the above embodiments were explained mainly in terms of a length measuring apparatus and a standard length measurement distance measurement apparatus, but as clear from the explanations of the operations of the same, the present invention also discloses methods of measuring the length of long objects.

Further, the length measuring apparatus, standard length measurement distance measurement apparatus, and methods thereof are not limited to the embodiments explained above. The present invention extend to the range which a person skilled in the art can apply based on the description disclosed in the description and the claims.

We claim:

1. A length measuring apparatus comprising:
   first and second mark detecting means (45;47, 46:48) which are arranged along a direction of movement of an elongated object, having a front and rear end, at exactly a standard length measurement distance (S) and which detect marks provided on said moving elongated object or marks provided on a tape along with said elongated object;
   a surplus length measuring means (49;50, 51) which measures a surplus length (C) comprised of the difference of distance between said standard length measurement distance and either distance between one mark and another mark provided on said elongated object or a distance between one mark and another mark provided on a tape; and
   a computation and control means (51) which is connected to the first and second mark detecting means and surplus length measuring means, which counts the movements of said elongated object by the standard length measurement distance in response to a mark detection signal from the second mark detecting means corresponding to the movement of said elongated object every standard length measurement distance, and calculates the surplus length based on an input from said surplus length measuring means in response to detection of a mark from the first mark detection means.

2. A length measuring apparatus as set forth in claim 1, wherein said computation and control means calculates a product of the count showing the movements of said elongated object by the standard length measurement distance and said standard length measurement distance when the elongated object has moved by the standard length measurement distance a plurality of times, calculates a sum of the surplus lengths of said plurality of times, adds the product of said count and the standard length measurement distance and the sum of the surplus lengths, and calculates a length of said elongated object.

3. A length measuring apparatus as set forth in claim 1 or claim 2, wherein said surplus length measuring means measures a continuous distance of movement of said elongated object.

4. A length measuring apparatus as set forth in claim 3, wherein said surplus length measuring means includes an encoder means (49) which has a rotating body (49A) which rotates in contact with the surface of said elongated object and outputs a position detection pulse in accordance with that rotation and a counting means (50) which counts the output pulses from the encoder means and
   said computation and control means (51) calculates said surplus length by referring to the count of said counting means in response to the detection of a mark by said first mark detecting means and updates the count showing the movements of said elongated object by said standard length measurement distance in response to the detection of a mark by the second mark detecting means.

5. A length measuring apparatus as set forth in claim 3, wherein said surplus length measuring means is a laser type movement distance measurement apparatus which uses the Doppler effect.

6. A length measuring apparatus as set forth in claim 3, wherein said surplus length measuring means is a laser type movement distance measurement apparatus which utilizes a spectral pattern.

7. A length measuring apparatus as set forth in claim 3, wherein said moving tape comprises marks provided in advance at substantially constant intervals.

8. A length measuring apparatus as set forth in claim 7, wherein said moving tape comprises optically detectable marks provided in advance at substantially constant intervals and
   said first and second mark detecting means include optical mark detecting means.

9. A length measuring apparatus as set forth in claim 7, wherein said moving tape is coated with a magnetic material, and magnetic marks are provided in advance on the magnetic material at substantially constant intervals, and
   said first and second mark detecting means have magnetic mark detecting means.

10. A length measuring apparatus as set forth in claim 9 wherein said magnetic mark is a bar code.

11. A length measuring apparatus as set forth in claim 1 or claim 2, wherein provision is made of a means (3, 4) for making a magnetic tape moving along with said elongated object adhere to the surface of said elongated object,
    a magnetic marking means is arranged which provides magnetic marks on said magnetic tape in the front of the direction of movement of said first mark detecting means,
    said first and second mark detecting means have first and second magnetic sensors which magnetically detect the magnetic marks provided by said magnetic marking means, said surplus length measuring means includes an encoder means (49) which has a rotating body (49A) which rotates in contact with the surface of said elongated object and outputs position detection pulses in accordance with the rotation and a counting means (50) which counts the output pulses from said encoder means, and said computation and control means (51) calculates said surplus length by referring to the count of said counting means in response to the detection of said magnetic mark by said first magnetic mark detecting means and updates the count showing the movements of said elongated object by said standard length measurement distance in response to the detection of the magnetic mark of said second magnetic mark detecting means.

12. A length measuring apparatus as set forth in claim 2, wherein the apparatus has arranged at the rear of the direction of movement of said first mark detecting means a marking means (43) which provides optically detectable marks on said elongated object, the first and second mark detecting means have first and second optical sensors (45:47, 46;48) which optically detect the marks provided by said marking means, said surplus length measuring means includes an encoder means (49) which has a rotating body (49A) which rotates in contact with the surface of said elongated object and outputs a position detection pulse signal in accordance with that rotation and a counting means (50) which counts the pulse signals from the encoder means, and said computation and control means (51) calculates said surplus length based on the count of said counting means in response to the detection of a mark by said first mark detecting means and updates the count showing the movement of said elongated object by said standard length measurement distance in response to the detection of a mark by said second mark detecting means.

13. A length measuring apparatus as set forth in claim 12, wherein said marking means is arranged at a position at the rear of the direction of movement of the first mark detecting means substantially equal to said standard length measurement distance (S).

14. A length measuring apparatus as set forth in claim 12, wherein said apparatus comprises a third optical mark detecting means (105, 107) arranged between said first optical mark detecting means and said second optical mark detecting means (46, 48) and a movement means (110, 106) which moves said third optical mark detecting means between said first and second mark detecting means and said computation and control means (51) drives said movement means so that an interval (D) between said marking means and said third optical mark detecting means becomes equal to said standard length measurement distance (S).

15. A length measuring apparatus as set forth in claim 12, wherein said second optical mark detecting means has at least two adjoining optical mark detecting means (86, 87) whose centerlines of detection coincide at a position intersecting the direction of movement of said elongated object, the optically detectable marks provided on said elongated object or the tape moving along with the elongated object have edges inclined to the direction of movement of said elongated object, the first and second optical mark detecting means detect said inclined edges, and said computation and control means (51) corrects the calculation of the distance based on a difference of said detected inclined edges by the first and second optical mark detecting means.

16. A length measuring apparatus as set forth in claim 12, comprising a means (53) for inputting a distance from the front end of the elongated object to the measuring portion of said surplus length measuring means or a distance from the front end of said elongated object to the second mark detecting means and a distance (1B) from the first mark detecting means to the rear end of said elongated object or a distance from the optical marking means which provides said optical marks to the rear end of said elongated object, and wherein said computation and control means (51) adds the distances inputted to the calculation of the length of said elongated object.

17. A length measuring apparatus as set forth in claim 1, wherein said surplus length measuring means includes an optical detecting means (61, 62) which has a centerline of detection oriented toward an end disposed at a rear of the direction of movement of said standard length measurement distance, detects a range of spread about the centerline during detection, and outputs a result as image data and said computation and control means (51) calculates said surplus length based on the image data from said optical detecting means in response to said detection of a mark by said first mark detecting means and updates the count showing the movements of the elongated object by said standard length measurement distance in response to detection of a mark by the second mark detecting means.

18. A length measuring apparatus as set forth in claim 17, wherein said apparatus has, near said moving elongated object, which is the centerline of detection of said optical detecting means, a reference scale having graduations provided along the direction of movement of the moving elongated object, said optical detecting means outputs as image data said marks, which are at positions away from said centerline of detection, along with the graduations of said reference scale, and said computation and control means (51) calculates said surplus length from said image data.

19. A length measuring apparatus as set forth in claim 17, wherein the optical detecting means which detects with a certain spread from said centerline of detection and outputs the results as image data has an image camera and a signal processing circuit.

20. A length measuring apparatus as set forth in claim 17, wherein said optical detecting means includes a laser switch.

21. A length measuring apparatus as set forth in claim 17, further comprising optically detectable marks which are made by ink jet or a stamp.

22. A length measuring apparatus as set forth in claim 1, wherein the standard length measurement distance is comprised to be automatically adjustable in accordance with temperature changes of said elongated object.

23. A length measuring apparatus as set forth in claim 22, wherein the means for automatically adjusting said standard length measurement distance in accordance with the temperature changes of said elongated object which may be a rod of a same material as said elongated object, and which extends in the direction of movement of said elongated object.

24. A length measuring apparatus comprising:

second and third mark detecting means (143;144, 145;146) which are arranged along a direction of movement of an elongated object, having a front and rear end, at a standard length measurement distance (S) and detect marks provided on a moving elongated object or marks provided on a tape moving along with said elongated object;

a first mark detecting means (141;142) which is arranged at the rear of the direction of movement said elongated object near the second mark detecting means;

a fourth mark detecting means (147;148) which is arranged in the front of the direction of movement of said elongated object near the third mark detecting means;

a first surplus length measuring means (33;32,36) which measures a surplus length (C) comprising the difference of distance between said standard length measurement distance and either a distance between one mark and another mark provided on said elongated object or a distance between one mark and another mark provided on the tape;

a second surplus length measuring means (35;34,37) which has a measuring portion provided along the direction of movement of said elongated object at a predetermined distance away from a measuring portion of said first surplus length measuring means and measures the surplus length comprising the difference of distance between said standard length measurement distance and either a distance between one mark and another mark provided on said elongated object or a distance between one mark and another mark provided on the tape; and a computation and control means (51) which is connected to said first, second, third, and fourth mark detecting means and said first and second surplus length measuring means, wherein said computation and control means judges discrepancies in said first, second, third, and fourth mark detecting means and said first and second surplus length measuring means by utilizing a normally operating mark detecting means and a normally operating surplus length measuring means to normalize said first or second mark detecting means so as to create a first normalized mark detecting means, and responds to the detection of a mark from the first normalized mark detecting means and calculates said surplus length based on an input from the normally operating surplus length measuring means, and uses a normalized third or fourth mark detecting means as a second normalized mark detecting means, and responds to a mark detection signal from the second normalized mark detecting means and counts the movements of said elongated object by said standard length measurement distance.

25. A length measuring apparatus as set forth in claim 24, wherein computation and control means calculates a product of the count showing the movements of said elongated object by the standard length measurement distance and said standard length measurement distance when the elongated object has moved by the standard length measurement distance a plurality of times, calculates a sum of the surplus lengths of said plurality of times, adds the product of said count and the standard length measurement distance and the sum of the surplus lengths, and calculates a length of said elongated object.

26. A length measuring apparatus as set forth in claim 24 or 25, wherein said surplus length measuring means measures a continuous distance of movement of said elongated object.

27. A length measuring apparatus as set forth in claim 26, wherein said first and second surplus length measuring means (36, 37) each has an encoder means (32, 34) which has a rotating body (33, 35) which rotates in contact with the surface of said elongated object and outputs a position detection pulse in accordance with that rotation and a counting means (36, 37) which counts the output pulses from the encoder means and said computation and control means (51) calculates said surplus length by referring to the count of said counting means in response to the detection of a mark by said first mark detecting means and updates the count showing the movements of said elongated object by said standard length measurement distance in response to the detection of a mark by the second mark detecting means.

28. A length measuring apparatus as set forth in claim 27, wherein said surplus length measuring means is a laser type movement distance measurement apparatus which uses the Doppler effect.

29. A length measuring apparatus as set forth in claim 27, wherein said surplus length measuring means is a laser type movement distance measurement apparatus which utilizes a spectral pattern.

30. A length measuring apparatus, comprising:

first and second detecting means arranged along a direction of movement of an elongated object to be measured, for detecting a length of the elongated object based on the movement of the elongated object relative to said first and second detecting means; and a surplus length measuring means for measuring a surplus length which is a difference between the length detected for the elongated object and a standard length measurement distance.

* * * * *